United States Patent [19]

Dunleavy et al.

[11] 4,280,979
[45] Jul. 28, 1981

[54] COPOLYMERS, COMPOSITIONS, AND ARTICLES, AND METHODS FOR MAKING SAME

[75] Inventors: Raymond A. Dunleavy, Charleston; William A. Gill, Hurricane, both of W. Va.

[73] Assignee: Union Carbide Corporation, New York, N.Y.

[21] Appl. No.: 76,624

[22] Filed: Sep. 18, 1979

[51] Int. Cl.³ .............. C08G 18/62; C08G 18/82; C08G 18/14
[52] U.S. Cl. .................. 264/157; 156/242; 156/246; 156/250; 264/45.3; 264/46.7; 264/53; 264/54; 264/236; 264/257; 264/328.18; 264/328.2; 264/331; 264/DIG. 5; 428/423.3; 428/424.8; 521/122; 521/128; 521/137; 528/52; 528/75; 525/39; 525/400; 525/445
[58] Field of Search .............. 252/182; 528/75, 52; 521/137, 122; 264/157, 236, 257; 525/440, 445, 39

[56] References Cited

U.S. PATENT DOCUMENTS

| | | | |
|---|---|---|---|
| 2,255,313 | 9/1941 | Ellis | 260/42 |
| 2,553,325 | 5/1951 | Loritsch | 260/78.5 |
| 2,642,403 | 6/1953 | Simon et al. | 260/2.5 |
| 2,642,410 | 6/1953 | Hoppens et al. | 260/45.4 |
| 2,643,985 | 6/1953 | Parker | 260/45.4 |
| 2,780,613 | 2/1957 | Rubens | 260/45.4 |
| 2,840,538 | 6/1958 | Minter et al. | 260/40 |
| 2,879,248 | 3/1959 | Nischk et al. | 260/45.4 |
| 2,888,433 | 5/1959 | Parker | 260/45.4 |
| 2,892,812 | 6/1959 | Helbing | 260/75 |
| 2,892,813 | 6/1959 | Georgian et al. | 260/75 |
| 2,915,493 | 12/1959 | Nischk et al. | 260/45.4 |
| 3,007,894 | 11/1961 | Bunge et al. | 260/45.4 |
| 3,008,917 | 11/1961 | Park et al. | 260/45.4 |
| 3,047,530 | 7/1962 | Nischk et al. | 260/45.4 |
| 3,109,833 | 11/1963 | Seiner | 260/75 |
| 3,340,083 | 9/1967 | Robitschek | 117/21 |
| 3,345,339 | 10/1967 | Parker et al. | 260/75 |
| 3,355,408 | 11/1967 | Mayer et al. | 260/29.6 |
| 3,371,056 | 2/1968 | DeLius | 260/22 |
| 3,597,495 | 8/1971 | Sekmakas et al. | 260/850 |
| 3,652,470 | 3/1972 | Zimmermann et al. | 260/22 CB |
| 3,652,639 | 3/1972 | Pizzini et al. | 260/465.4 |
| 3,700,752 | 10/1972 | Hutchinson | 260/859 R |
| 3,723,370 | 3/1973 | Watanabe et al. | 260/22 TN |
| 3,776,980 | 12/1973 | Scardiglia et al. | 260/872 |
| 3,882,189 | 5/1975 | Hudak | 260/850 |
| 3,901,953 | 8/1975 | Watanabe et al. | 260/865 |
| 3,911,048 | 10/1975 | Vargiu et al. | 260/861 |
| 3,911,050 | 10/1975 | Cooke et al. | 260/869 |
| 3,923,927 | 12/1975 | Miyake et al. | 260/861 |
| 4,006,272 | 2/1977 | Sakaguchi et al. | 428/268 |
| 4,036,908 | 7/1977 | Chretien et al. | 260/863 |
| 4,098,733 | 7/1978 | Olstowski et al. | 521/123 |
| 4,158,027 | 6/1979 | Restaino | 260/859 R |
| 4,166,889 | 9/1979 | Fujii et al. | 521/55 |
| 4,181,781 | 1/1980 | Chandalia et al. | 521/137 |
| 4,189,517 | 2/1980 | Shanoski et al. | 428/423.7 |

FOREIGN PATENT DOCUMENTS

| | | |
|---|---|---|
| 460392 | 10/1949 | Canada. |
| 956720 | 1/1957 | Fed. Rep. of Germany. |
| 2300372 | 7/1973 | Fed. Rep. of Germany. |
| 1477822 | 3/1967 | France. |
| 35-4785 | 5/1960 | Japan. |
| 49-109496 | 10/1974 | Japan. |
| 744027 | 1/1956 | United Kingdom. |

OTHER PUBLICATIONS

Japanese Publication JA-49109496, Oct. 17, 1974.

Primary Examiner—H. S. Cockeram
Attorney, Agent, or Firm—Richard J. Gallagher

[57] ABSTRACT

Novel polyester diols are described containing aliphatically saturated divalent diacyl moieties and olefinically unsaturated divalent diacyl moieties in a mole ratio of 0.25:1 to 3:1; and divalent dioxy moieties which are linear and/or branched, preferably divalent branched dioxy moieties and divalent linear dioxy moieties in a mole ratio of 0.3:1 to 3:1, the diacyl moieties being bonded through ester linkage to the dioxy moieties in a mole ratio of at least 1.75 dioxy moieties per diacyl moiety, wherein the polyester diol is end-blocked essentially only by alcoholic hydroxyl groups and has an acid number of less than 3. The novel polyester diols are highly useful in the production of polyurethane/vinyl polymer copolymers by reaction with polyisocyanates and polymerizable ethylenically unsaturated monomers. The polyester diols can be used for this purpose by mixing same with the polymerizable ethylenically unsaturated monomer, a catalyst capable of catalyzing polyurethane-forming reactions of polyisocyanates and polyhydroxyl compounds and the resulting compositions can be used in batch or automated molding operations. The novel tough polyurethane/vinyl polymer copolymers, reinforced or unreinforced, are useful as substitutes for metals in the manufacture of structural and other parts, such as, automotive fenders for the purpose of providing energy-saving light-weight parts, and appliance and business machine housings.

30 Claims, No Drawings

COPOLYMERS, COMPOSITIONS, AND ARTICLES, AND METHODS FOR MAKING SAME

CROSS-REFERENCE TO RELATED APPLICATION

Application Ser. No. 76,625, filed on Sept. 18, 1979, and now U.S. Pat. No. 4,241,199 and entitled NOVEL POLYESTER DIOLS, discloses and claims the novel polyester diols which are utilized in the various compositions and processes claimed herein.

BACKGROUND OF THE INVENTION

1. Field Of The Invention

The invention relates to novel polyester diols that are reactive with polyisocyanates and polymerizable olefinically unsaturated monomers to produce tough polyurethane/vinyl polymer copolymers. The invention also relates to novel compositions containing said polyester diols, to said polyurethane/vinyl polymer copolymers, and to novel methods for making them.

2. Description Of The Prior Art

Polyester polyols have been and are currently being used in the production of polyurethane products. In addition, as explained more specifically hereinafter, such polyester polyols have in certain cases been reacted with polyisocyanates and olefinically unsaturated monomers but in no case in the prior art has there been any disclosure or suggestion of preparing polyester diols of the type provided by this invention or which are capable of providing the polyurethane/vinyl polymer copolymers produced by the present invention.

Japanese Publication No. JA-49109496, published Oct. 17, 1974, discloses compositions made from unsaturated polyester polyols, polyisocyanates and olefinically unsaturated monomers, such as styrene. The unsaturated polyester polyol disclosed by this publication, however, is produced from olefinically unsaturated dibasic acids or anhydrides and does not teach or suggest polyester diols made from aliphatically saturated and olefinically unsaturated dicarboxylic acids. The absence of aliphatically saturated dicarboxylic acids or anhydrides results in final resin compositions which have inferior physical properties, such as elongation and brittleness as compared to the final resin products made in accordance with the present invention. Furthermore, this publication is dedicated to ensuring that vinyl polymerization occurs before or during the early stages of polyurethane-formation and, to force this result, requires the use of two vinyl polymerization catalysts, azobisisobutyronitrile and a peroxide or peroxide-generating catalyst.

U.S. Pat. No. 3,008,917 discloses the preparation of polyisocyanate-polyester adducts which are subsequently reacted with vinyl monomer, such as styrene, to form coatings, castings, laminates, adhesives, etc., which, however, have inferior physical properties, e.g., impact resistance, compared to compositions of this invention. In addition, this patent fails to disclose any olefinically unsaturated polyesters in which the ratio of glycol moieties to dicarboxylic acid moieties is 1.75:1 or more. Specifically, in col. 2, the formula shown on line 20 contains usually three or more repeating units which results in a ratio of four glycol moieties to three dicarboxylic acid moieties representing approximately 33⅓% excess glycol or 1.33⅓ glycol moieties per dicarboxylic acid moiety. Also, column 4, lines 20 through 28 define a maximum of 40% excess of the glycol moiety which is not near to a 2:1 ratio. This patent teaches the need to use hot styrene for the purpose of dissolving the high molecular weight polyisocyanate polyester adduct (col. 5, lines 6–9). This causes additional handling and safety difficulties as well as requires the presence of a gelation inhibitor specified by Park et al during the difficult mixing stage. Another distinction over the Park et al patent is the necessity in Park et al of using large amounts of unreacted isocyanate groups (col. 7, line 73 through col. 8, line 5).

U.S. Pat. Nos. 2,915,493; 2,879,248 and 3,047,530 and British Pat. No. 744,027 disclose mixtures of polyisocyanate-modified unsaturated polyesters and vinyl monomers such as styrene. These patents, however, fail to disclose any polyester diol in which the mole ratio of glycol moieties to dicarboxylic acid moieties is 1.75 or more.

German Pat. No. 956,720, issued 1957, discloses the preparation of compositions from an olefinically unsaturated polyester polyol, an olefinically unsaturated monomer and a polyisocyanate, but fails to disclose the use of combinations of a branched glycol or its equivalent and a linear glycol or its equivalent as specified in the present invention. In addition, the German patent fails to disclose or suggest a ratio of polyol moieties to polycarboxylic acid moiety of 1.75:1 or more. As a consequence, the resin compositions produced by the German patent possess physical properties that are inferior to those provided by applicants' resin compositions.

French Pat. No. 1,477,822 discloses molded polyester resins intended for the manufacture of molded products or surface coating compositions relying on humidity-curing in order to produce a hard solid product. The patent, however, does not disclose or suggest unsaturated polyester resins which are made from combinations of saturated and unsaturated dicarboxylic acids or anhydrides and branched and linear glycols, such as are described in the present invention. In addition, the unsaturated polyester compositions of the French patent are reacted with a large stoichiometric excess of polyisocyanate which results in a prepolymer having a large proportion of free NCO groups and which is designed for use in a humidity-cured product. Furthermore, the unsaturated polyester-polyisocyanate prepolymer, if not made with an excess of polyisocyanate, would form solid, or at least highly viscous, and difficult-to-dissolve materials which could not be combined with styrene except with extreme difficulty, if at all. There is no disclosure or suggestion of the unsaturated polyester diols disclosed and claimed herein nor of the polymerizable compositions containing the polyester diol, polyisocyanate, olefinically unsaturated monomer and the respective catalysts as described and claimed herein.

U.S. Pat. No. 3,723,370 relates to urethanated unsaturated polyester resins prepared by mixing and reacting an olefinically unsaturated polyester resin, an olefinically unsaturated monomer, e.g., styrene and a polyisocyanate. The patent cautions that when the ratio of polyhydric alcohol to polycarboxylic acid is more than 1.7, it is difficult to obtain a suitable unsaturated polyester. In addition, the patent fails to disclose or suggest unsaturated polyester polyols having acid numbers below 3.

U.S. Pat. No. 3,776,980 discloses the preparation of olefinically unsaturated polyesters having high acid numbers and fails to disclose or suggest the use of the glycol mixtures disclosed in the present invention.

There are many other patents and publications directed to olefinically unsaturated polyesters in addition to those specified above. However, these additional patents and publications fail to disclose or suggest olefinically unsaturated polyester polyols having acid numbers below 3 and made from glycols and polycarboxylic acids in glycol-to-acid mole ratio of 1.75 or more. Included in such patents and publications are German Publication No. 2,300,372, laid open to the public July 12, 1973, Canadian Pat. No. 460,392, Japanese Publication No. JA 4785, published May 9, 1960 and U.S. Pat. Nos. 2,255,313; 2,553,325; 2,642,410; 2,642,403; 2,643,985; 2,780,613; 2,840,538; 2,888,433; 2,892,812; 2,892,813; 3,007,894; 3,008,917; 3,109,833; 3,340,083; 3,345,339; 3,355,408; 3,371,056; 3,597,495; 3,652,470; 3,882,189; 3,901,953; 3,911,048; 3,911,050; 3,923,927; 4,006,272; 4,036,908; 4,098,733; 4,158,027.

SUMMARY OF THE INVENTION

The present invention provides polyester diols that are reactive with polyisocyanates and polymerizable ethylenically unsaturated monomers to provide cross-linked polymeric materials of exceptional toughness. These polyester diols are highly suitable for processing with the polyisocyanates and ethylenically unsaturated monomers via batch or automated molding operations to provide parts or articles having a high modulus and exceptional toughness. The polyurethane/vinyl polymer copolymer cross-linked polymeric materials of this invention, reinforced or unreinforced, provide a low cost, light weight, high modulus, plastic material capable in many instances of replacing metal which is to be subjected to high stress and high impact conditions. The polymeric materials of this invention are uniquely capable of meeting the high modulus, elasticity and toughness performance requirements heretofore filled by metals.

The deficiencies of the prior art as mentioned above, are overcome by this invention by the preparation and utilization of a polyester diol containing aliphatically saturated divalent diacyl moieties of the formula

wherein R is a single bond connecting the two carbonyl groups or a divalent organic group free of aliphatic unsaturation, preferably an olefinically unsaturated hydrocarbon group, and olefinically unsaturated divalent diacyl moieties of the formula

in which R' is a divalent olefinically unsaturated organic group, preferably a divalent olefinically unsaturated hydrocarbon group. The above-mentioned diacyl moieties are present in a mole ratio of 0.25 to 3 moles, preferably 1 to 3 moles, of said diacyl moieties free of aliphatic unsaturation for each mole of said olefinically unsaturated diacyl moieties. The olefinically unsaturated diacyl moieties can be the same or different, i.e., R can be the same or different and the olefinically unsaturated diacyl moieties can be the same or different, i.e., R' can be the same or different, within the polyester diol composition.

The other component of the polyester diol, namely, the dioxy moieties are divalent organic dioxy moieties including divalent dioxy moieties which are linear and/or branched, preferably both, divalent branched dioxy moieties and divalent linear dioxy moieties. The divalent dioxy moieties are represented by the formula

in which R" is a divalent organic group which, illustratively, is composed of carbon, hydrogen and/or halogen, and optionally oxygen, sulfur, nitrogen, and/or silicon.

Preferably, the dioxy moieties can be represented by the formula:

wherein R''' is a divalent branched chain composed of carbon and hydrogen or carbon, hydrogen and oxygen and contains 2 to 8 consecutive atoms of carbon or carbon and oxygen interconnecting the oxy groups of said moiety as shown in the formula. R''' is formed with branches which are preferably alkyl groups of 1 to 8 carbon atoms bonded to one or more carbon atoms of the consecutive atoms interconnecting the oxy groups. In addition, the polyester diol can contain divalent linear dioxy moieties which are represented by the formula

in which R'''' is a linear chain composed of carbon and hydrogen or carbon, hydrogen and oxygen and contains 2 to 8 consecutive atoms of carbon or carbon and oxygen interconnecting the oxy groups of the linear dioxy moieties as shown in the formulas therefor. The dioxy moieties in the polyester diol are present in a mole ratio of 0.3 to 3 moles, of the branched dioxy moieties per mole of linear dioxy moieties. The above-mentioned diacyl moieties are bonded through ester linkages to said dioxy moieties in a mole ratio of at least 1.75 moles, preferably, about 2 moles, of the total dioxy moieties per mole of the total of diacyl moieties. The polyester diol is end-blocked essentially only by alcoholic hydroxyl groups bonded to dioxy moieties. The novel polyester diols have an acid number of less than 3, preferably less than 1, and most preferably less than 0.5. R''' and R'''', respectively, can be the same or different within the polyester diol composition.

The tough polyurethane/vinyl polymer copolymer crosslinked polymeric materials of the present invention (also called hybrid PUV polymeric materials for brevity) are prepared by reacting the above-described polyester diol with a polyisocyanate and a polymerizable ethylenically unsaturated monomer. The isocyanate groups of the polyisocyanate react with the hydroxyl groups of the polyester diol to form a polyurethane and cross-linking occurs through vinyl polymerization of the olefinically unsaturated groups of the polyester diol (i.e., imparted by the olefinically unsaturated diacyl moieties), and the polymerizable ethylenically unsaturated monomer to thereby result in a cross-linked polymeric material characterized by high modulus and exceptional toughness. In these polymerization reactions there can be used a catalyst capable of catalyzing polyurethane-forming reactions of polyisocyanates and polyhydroxyl compounds and a vinyl polymerization catalyst capable of catalyzing the vinyl polymerization of the polymerizable ethylenically unsaturated monomer with itself and with the polyester diol. A vinyl polymerization inhibitor can be used for the purpose of stabilizing mixtures of the polyester diol and ethylenically unsaturated monomer during shipment or storage, to control the vinyl polymerization, to provide improved ultimate elongation, and for other purposes.

A consistent drawback of the prior art has been the need to utilize excessive amounts of polyisocyanates, for example, to permit solubilization or uniform mixing of the olefinically unsaturated monomer, such as, styrene with the polyisocyanate. The present invention overcomes this deficiency of the prior art and provides more uniform compositions and resulting polymeric materials. These advantages permit and facilitate the mixing of reinforcing materials, such as glass powder, tiny glass bubbles, or, preferably glass fibers, with the polyester diol, polyisocyanate and olefinically unsaturated monomer.

DETAILED DESCRIPTION OF THE INVENTION

The novel polyester diols of this invention as mentioned above contain divalent diacyl moieties of the formulas:

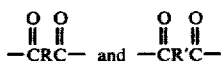

and divalent organic dioxy moieties of the formula: —OR"O—, preferably of the formulas: —OR'''O— and/or —OR''''O—, more preferably both, interconnected to form ester linkages.

The divalent organic groups represented by R and R" include alkylene groups having 1 to 16 carbon atoms, aralkylene groups having 7 to 16 carbon atoms, arylene groups having 6 to 16 carbon atoms and substituted alkylene, aralkylene or arylene groups having 6 to 16 carbon atoms substituted, for example, with halogen, alkyl, nitro, amino, sulfhydryl, sulfo, thienyl groups, etc. The aliphatically saturated divalent diacyl groups, R, can be derived from such acids and anhydrides as oxalic, malonic, succinic, glutaric, adipic, pimelic, suberic, azelaic acid, sebacic and undecanedioic acids and anhydrides as well as isophthalic, phthalic, hexahydrophthalic acids and anhydrides, halogenated dibasic acids and anhydrides, e.g., 3-chlorophthalic, 4-bromophthalic, 3,5-dichlorophthalic, bromomalonic, 2,3-dibromosuccinic, 2,3-dichlorosuccinic acids and anhydrides, or any dicarboxylic acid or anhydride that is essentially free of aliphatic unsaturation.

The divalent organic groups represented by R' include alkylene groups of 1 to 16 carbon atoms, cycloalkylene groups having 4 to 16 carbon atoms, aryl substituted alkenylene groups having 8 to 16 carbon atoms, and aryl substituted cycloalkenylene groups having 8 to 16 carbon atoms. The aliphatically unsaturated divalent organic groups, R', can be derived from such acids and anhydrides as maleic, citraconic, mesaconic, fumaric, itaconic, 2-octenedioic, 4-pentyl-2-5-heptadiene dioic, glutaconic ethylidenemalonic, isopropyladenemalonic, allylmalonic, 2,4-hexadiene-1,6-dioic acid, ethylideneglutaric, isoamylideneglutaric, alpha-hydromuconic, beta-hydromuconic, 4-amyl-2,5-heptadienedioic, chloromaleic, dichloromaleic, allyl succinic, tetrahydrophthalic, tetrachlorophthalic, tetrabromophthalic, hexachloroendomethylenetetrahydrophthalic, 2-octenedioic, and carbic acids and anhydrides and the like.

The divalent branched chains represented by R''' include alkylene having from 2 to 16 carbon atoms and 2 to 8 consecutive atoms between the valences of the group, such as, 1,2-propylene, 2,4-butylene, 2-ethylhexylene, 3,4-diethyl-3,4-hexylene, 2-ethyl-1,3-hexylene, 3-methyl-2,4-heptylene, 2,2,4-trimethyl-1,3-pentylene, 2,2-dimethyl-1,5-pentylene, 2,3-pentylene, 1,2-pentylene, 1,2-butylene, 2,3-dimethyl-2,3-butylene, 4,5-octylene; and branched alkyleneoxyalkylene groups or branched alkyleneoxyalkyleneoxyalkylene groups, such as 1,2-propyleneoxy-1,2-propylene, and 1,2-propyleneoxy-1,2-propyleneoxy-1,2-propylene groups. The divalent branched chain represented by R" can be derived from diols such as 1,2-propylene glycol, di-1,2-propylene glycol, tri-1,2-propylene glycol, 1,3-butane diol, 2-ethyl hexane diol, 3,4-diethyl-3,4-hexane diol, 2-ethyl-1,3-hexane diol, hexachlorophene, alkylene oxide adducts of bisphenol A and substituted derivatives thereof as disclosed in U.S. Pat. No. 4,158,027 (col. 7, line 40 to col. 8, line 6) incorporated herein by reference, 3-methyl-2, 4-heptane diol, 2,2,4-trimethyl-1,3-pentane diol, 2,2-dimethyl-1,5-pentane diol, 2,3-pentane diol, 1,2-pentane diol, 1,2-butane diol, 2,3-dimethyl-2,3-butane diol, 4,5-octane diol. The divalent linear chains represented by R'''' include alkylene groups having 2 to 8 carbon atoms, such as ethylene, 1,3-propylene, 1,4-butylene, 1,5-pentylene, 1,6-hexylene, 1,7-heptylene and 1,8-octylene and linear alkyleneoxyalkylene groups or linear alkyleneoxyalkyleneoxyalkylene groups, such as ethyleneoxyethylene, and ethyleneoxyethyleneoxyethylene groups. The divalent linear chains represented by R'''' can be derived from diols, such as ethylene glycol, 1,3-propylene glycol, 1,4-butane diol, 1,5-pentane diol, 1,6-hexane diol, 1,7-heptane diol, 1,8-octane diol, diethylene glycol and triethylene glycol.

The polyester diols are prepared by reacting an aliphatically saturated dicarboxylic acid or anhydride, an olefinically unsaturated dicarboxylic acid or anhydride, a diol, e.g., a branched diol and/or a linear diol under conditions wherein esterification takes place. The glycols and acids and/or anhydrides are mixed and heated with stirring until reaction takes place, preferably the heating is conducted slowly with stirring until solid reactants, if any, have been melted and initial exotherm has occurred. The temperature is then raised to a temperature in the range of 200° to 215° C. If the acid number of the polyester diol has not dropped to less than 3 during normal cook-out time, a final cook-out is conducted at a temperature in the range of 215° to 230° C. until the acid number has dropped to below 3. The reaction time is not narrowly critical and can vary from 10 hours or less to 25 hours or more; whatever time and temperature is necessary to reduce the acid number to an acceptable value. It is preferred to conduct the esterification reaction in an inert atmosphere such as under a nitrogen atmosphere. Also a vinyl polymerization inhibitor, such as hydroquinone, is advantageously added to the resulting polyester diol after it is formed in order to assure against premature vinyl polymerization of the ethylenically unsaturated polyester diol made therefrom.

The total amount of both the linear and branched diols used to react with the aliphatically saturated and olefinically unsaturated dicarboxylic acid or anhydride, should be at least 1.75, preferably about 2 moles of all diol per mole of all dicarboxylic acids or anhydrides. In order to allow for the loss of glycol because of the high temperatures used during the esterification reaction, it is preferred to utilize an excess of both diols, preferably, a total of about 10 wt. % more diol is used than that stoichiometrically required for the reaction. The relative proportions of aliphatically saturated dicarboxylic acids and/or anhydrides and olefinically unsaturated dicarboxylic acids and anhydrides used to react with the diols are 0.25 to 3 moles, preferably 1 to 3 moles, of the aliphatically saturated dicarboxylic acids or anhydrides per mole of olefinically unsaturated dicarboxylic acid and/or anhydrides. The proportions of branched diol and linear diol used in the preparation of the polyester diols can range from 0.3 to 3 moles of the branched diol per mole of linear diol.

If desired, mixtures of different types of linear diols can be used as well as mixtures of different types of branched diols can be used to produce the novel polyester diols. Similarly, mixtures of different aliphatically saturated dicarboxylic acids or anhydrides can be used and/or mixtures of different olefinically unsaturated dicarboxylic acids or anhydrides can be used to produce the polyester diols of this invention. In fact, certain advantages in improved impact resistance have been discovered when mixtures of isophthalic acid or anhydride and adipic acid or anhydride are employed, as will be clear from the examples presented hereinafter.

The resulting polyester diols produced as described herein are end-blocked essentially only by alcoholic hydroxyl groups that are bonded to the dioxy moieties derived from the diol reactant. They are characterized by relatively low molecular weights ranging, for example, from about 200 to about 500, illustratively, from 279 to 477 on a calculated basis. Additionally, the polyester diols are characterized by having an acid number of less than 3 and, preferably, less than 1 and having relatively high hydroxyl numbers, for example, ranging from 218 to 402. The polyester diols for the most part are liquids at ambient temperature and are further characterized by having moderate to low viscosities which is a decided advantage from the standpoint of ease of handling and subsequent reaction.

The novel tough high modulus polyurethane/vinyl polymer cross-linked polymeric materials are produced by reacting the polyester diol, the polyisocyanate and the polymerizable ethylenically unsaturated monomer in the presence of a catalyst capable of catalyzing the vinyl polymerization. If desired, the polyurethane-forming reaction may be catalyzed with a catalyst capable of catalyzing such reactions in which case the polyurethane-forming reaction may be initiated at lower, e.g., ambient, temperatures when the polyester diol contacts the polyisocyanate, or to provide short gel times as may be required in RIM processing. A vinyl polymerization inhibitor can also be employed to retard vinyl polymerization involving the ethylenically unsaturated monomer and/or the polyester diol until the polyurethane-forming reaction has begun and has proceeded to a suitable extent. In addition, other additives including internal mold release agents, such as, zinc stearate, fillers, such as calcium carbonate, thickeners, such as MgO, pigments, such as carbon black, reinforcing agents, such as glass fibers, and low profile additives such as polyvinyl acetate, or thermoplastic polyurethane powders, can be used.

One method of preparing such polyurethane/vinyl polmer cross-linked polymeric material is the bulk molding method and involves mixing the polyester diol, the ethylenically unsaturated monomer, the polyisocyanate, the vinyl polymerization catalyst and the vinyl polymerization inhibitor, if used, following which solid additives, such as, fillers, pigments, internal mold release, low profile additives such as thermoplastic polyurethane powders, and reinforcing agents are added and mixed until a substantially homogeneous mixture is obtained. Thereafter, the mixture can be molded by the application of heat and pressure. It is desirable after blending all of the above-mentioned components to allow the mixture to maturate with time to reach the desired molding viscosity, for example, 100 to $10^8$ cps at 25° C. During maturation, measures are usually taken to prevent the loss of volatile materials, e.g. styrene. For example, the mixture can be encapsulated in aluminum foil to prevent evaporation of the volatile materials. In the bulk molding method the maturated mixture, if desired, can be placed in transfer molding equipment or in injection molding equipment and transfer molded or injection molded in the conventional manner. Furthermore, the maturated mixture can be employed as a sheet molding compound, for example, by doctoring a sheet of the mixture on polyethylene film followed by overlaying the sheet of mixture with another polyethylene film and cutting the sandwich into the desired shape. Optionally, the glass fiber reinforcing agent can be sprinkled onto the mixture sheet prior to overlaying with the second polyethylene film and compressing the resulting sandwich after overlaying the mixture sheet with the second polyurethane film. This latter technique can avoid undue equipment wear by avoiding the need for mixing and handling mixtures containing glass fibers. The sandwich following cutting can be shaped into the desired shape and heated and compressed to cure the mixture into the desired shape.

Another method of producing the polyurethane/vinyl polymer cross-linked polymeric materials is to mix the polyester diol, ethylenically unsaturated monomer, the vinyl polymerization catalyst and the polyurethane reaction catalyst and withholding the polyisocyanate until it is desired to initiate the polyurethane reaction. Upon mixing the polyisocyanate into the above-mentioned mixture, the polyurethane-forming reaction is initiated and provides an exotherm which initiates the vinyl polymerization reaction by the free radical formed upon heat decomposition of the vinyl polymerization catalyst. This method has the advantage that the polyester diol, ethylenically unsaturated monomer and catalyst can be further mixed with a vinyl polymerization inhibitor and the resulting mixture can be stored, shipped and/or sold.

A third method of producing the polyurethane/vinyl polymer cross-linked polymeric materials is by the RIM (reaction injection molding) process. In this process, two packages are prepared for subsequent rapid mixing and molding by machine. One package comprises a mixture of the polyester diol, the ethylenically unsaturated monomer, the polyurethane reaction catalyst and a high level of vinyl polymerization inhibitor. The other package comprises a mixture of the polyisocyanate and the vinyl polymerization catalyst. Both packages, when properly formulated, are relatively stable such that they can be stored, shipped and/or sold. At the time of use the packages are rapidly and continuously mixed and molded into the desired shapes.

The polymerizable ethylenically unsaturated monomers which can be used in this invention to form the hybrid PUV polymeric materials include the polymerizable ethylenically unsaturated organic monomers, the molecules of which are composed of carbon, hydrogen with or without at least one atom of halogen, O, S, or N and preferably include the polymerizable ethylenically unsaturated hydrocarbon monomers. The monomers useful in this invention are the polymerizable monomers characterized by the presence therein of at least one polymerizable ethylenically unsaturated group of the type

These monomers can be used singly or in combination to produce the hybrid PUV polymeric materials of this invention.

These monomers are well known in the art and include the hydrocarbon monomers such as styrene, alphamethylstyrene, methylstyrene, 2,4-dimethylstyrene, ethylstyrene, isopropylstyrene, butylstyrene, phenylstyrene, cyclohexylstyrene, benzylstyrene, and the like, substituted styrenes such as cyanostyrene, nitrostyrene, N,N-dimethylaminostyrene, acetoxystyrene, methyl 4-vinylbenzoate, phenoxystyrene, p-vinyl diphenyl sulfide, p-vinylphenyl phenyl dioxide, and the like; the acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, acrylonitrile, methacrylonitrile, ethyl alpha-ethoxyacrylate, methyl alpha-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl and vinylidene halides, e.g., vinyl chloride, vinyl fluoride, vinylidene chloride and the like; the vinyl esters, vinyl ethers, vinyl ketones, etc. such as vinyl acetate, vinyl alcohol, vinyl butyrate, isopropenyl acetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like; butadiene, isoprene, 1,4-pentadiene, 1,6-hexadiene, 1,7-octadiene. Any of the known polymerizable monomers can be used and the compounds listed above are illustrative and not restrictive of the monomers suitable for use in this invention.

The proportion of polymerizable ethylenically unsaturated monomer employed is not narrowly critical and preferably ranges from that amount providing about 1 to about 6 ethylenically unsaturated groups of the monomer per olefinically unsaturated group of the polyester diol. A most preferred amount is that which provides about two ethylenically unsaturated groups per olefinically unsaturated group of the polyester diol.

Vinyl polmerization catalysts useful in producing the hybrid PUV polymeric materials of this invention are the free radical type of vinyl polymerization catalyst, such as, the peroxides, persulfides, perborates, percarbonates, and the azo compounds or any other suitable catalyst capable of catalyzing the vinyl polymerization of the polyester diol and/or the ethylenically unsaturated monomer. Illustrative of a few such catalysts are 2,2'-azo-bis-isobutyronitrile, dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexoate, t-butylperoctoate, t-butylperneodecanoate, t-butylperbenzoate, t-butylpercrotonate, t-butyl perisobutyrate, di-t-butyl perphthalate and the like.

The vinyl polymerization catalyst concentration is not critical and can be varied within wide limits. As a representative range, the concentration can vary from about 0.1 to about 5 wt. % based on the total weight of polyester diol and polymerizable ethylenically unsaturated monomer. Up to a certain point, increases in the vinyl polymerization catalyst concentration result in increased monomer conversion but further increases do not substantially increase conversion. The catalyst concentration selected will usually be an optimum value considering all factors, including costs.

It is sometimes desirable to inhibit the vinyl polymerization for storage and shipping purposes and/or until such time that the polyurethane reaction has begun and proceeded to a substantial extent. For example, to the extent of 50% or more. It is, furthermore, especially preferred to utilize a vinyl polymerization inhibitor in those cases where the polyester diol and/or polymerizable ethylenically unsaturated monomers are to be stored, shipped or sold. Suitable vinyl polymerization inhibitors are hydroquinone, quinone, para-benzoquinone, t-butyl catechol, quinhydrone, toluhydroquinone, mono-t-butylhydroquinone, 2,5-di-t-butylhydroquinone, hydroquinone monomethyl ether, the biphenol derivatives described in U.S. Pat. No. 4,158,027, and the like. Para-benzoquinone is the preferred inhibitor. The amount of inhibitor for the purpose of preventing vinyl polymerization can be that conventionally used, namely up to about 100 parts per million of the combined weight of the polyester diol and polymerizable ethylenically unsaturated monomer. It has, however, been unexpectedly found that abnormally high amounts of inhibitor, e.g., 250 ppm or more provide greater elongation (at comparable tensile strengths) in the hybrid PUV polymeric materials of this invention. It has also been unexpectedly found that considerably more energy is required to break an article made from a hybrid PUV polymeric material according to this invention in which 500 ppm or more of inhibitor is used. Preferred amounts of inhibitor, when used, therefore, range from 500 ppm to 1000 ppm in which case the inhibitor serves to control the initiation of the vinyl polymerization involving the polyester diol and/or the polymerizable ethylenically unsaturated monomer.

The polyisocyanates that are useful in producing the hybrid PUV polymeric materials in accordance with this invention are organic compounds that contain at least two isocyanate groups, such compounds are well known in the art. The organic polyisocyanates that are useful in producing the novel compositions and hybrid PUV polymeric materials in accordance with this invention are organic compounds that contain at least two isocyanate groups and include the monomeric and polymeric organic polyisocyanates such as prepolymers produced by reacting a polyol with an excess of a polyisocyanate. The quasi-prepolymers such as the reaction products of excess tolylene diisocyanate and short chain polyoxypropylene diols or triols, are preferred in those instances where ease of processing such materials is desired. Suitable organic polyisocyanates include the hydrocarbon diisocyanates (e.g., the alkylene diisocyanates and the arylene diisocyanates) as well as known triisocyanates. As examples of suitable polyisocyanates one can mention, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl) ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl) sulfide, 1,4-diisocyanatobenzene, 2,4-diisocyanatotoluene, 2,6-diisocyanatotoluene and mixtures thereof, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene, 4,4'-diphenylmethylene diisocyanate, 3,3'-diphenylmethylene diisocyanate, 2,4'-diphenylmethylene diisocyanate, modified diphenylmethylene diisocyanates modified with carbodiimides to liquefy same, and polymethylene poly(phenyleneisocyanates) having the formula:

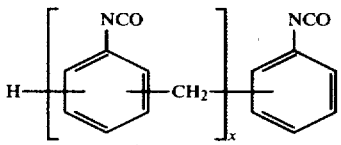

wherein x has an average value from 1.1 to 5 inclusive (preferably from 2.0 to 3.0), and mixtures thereof.

The amount of polyisocyanate used is not narrowly critical and preferably ranges from an amount that provides about 0.9 isocyanate group of the polyisocyanate per hydroxyl group of the polyester diol to an amount that provides about 1.2 isocyanate groups per hydroxyl group of the polyester diol. These amounts are suitable when the compositions are cast in a mold. In the event, however, the RIM method is used or low pressure molding or the sheet molding technique is used, the range preferably is from about 1 to about 1.1 isocyanate groups of the polyisocyanate per hydroxyl group of the polyester diol. For the compression molding method, that is the slow cure method, the broad range is about 0.9 to about 1.1 and the preferred narrow range is about 0.98 to about 1.02 isocyanate groups of the polyisocyanate per hydroxyl group of the polyester diol.

The catalysts that are useful in catalyzing the polyurethane-formation in producing the hybrid PUV polymeric materials in accordance with this invention include: (a) tertiary amines such as bis(dimethylaminoethyl) ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethylanolamine, 1,4-diazabicyclo[2.2.2.]octane, pyridine oxide and the like; (b) tertiary phosphines such as trialkylphosphines, dialkylbenzylphosphines, and the like; (c) strong bases such as alkali and alkaline earth metal nydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetyl-acetoneimine, bis-acetylacetonealkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino) alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravlent tin, trivalent and pentavalent As, Sb, and Bi, and metal carbonyls of iron and cobalt.

The organotin compounds deserve particular mention as catalysts for catalyzing the polyurethane-forming reactions. These compounds include the dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts, e.g., the organotin catalysts. Metal catalysts, or combinations of metal catalysts, may also be employed as the accelerating agents, without the use of amines. The catalysts for catalyzing the polyurethane-forming reaction are employed in small amounts, for example, from about 0.001 percent to about 5 percent, based on the combined weight of the polyisocyanate and the polyester diol.

As mentioned above, other additives can be used in the manufacture of the hybrid PUV polymeric materials of this invention. For example, fillers, such as calcium carbonate can be added for the purpose of enhancing surface smoothness and gloss can be added. The amounts of fillers used can range from 0 to 250 pph, parts per hundred parts of polymeric materials (e.g., polyester diol, polymerizable ethylenically unsaturated monomer and polyisocyanate). Additionally, mold release agents, such as zinc stearate, can be used in amounts ranging from 2 to 4 pph based on the combined weights of polymeric materials. Additionally, reinforcing agents, such as glass powder, tiny glass bubbles, and preferably glass fibers $\frac{1}{8}''$ to $\frac{1}{4}''$ long can be added. The amount of reinforcing agents ranges from 0 to 70 wt. %, preferably about 5 to 70 wt. %, based on the combined weight of the three above-mentioned reactants. Thickeners such as Mgo can also be used in amounts ranging from 0 to 2 pph based on the combined weight of the three above-mentioned reactants. Any other additives such as pigments conventionally employed in the polyester and/or polyurethane technologies can be added in conventional proportions. The pph's weight percentages given above for the additives are merely representative and amounts of additives outside of these ranges can provide acceptable results.

The distinction between polyurethane foams and elastomers is not sharply defined because all foams and most elastomers contain a gas phase. The foams in general have densities of less than 10 pounds per cubic foot and elastomers, in general, have densities above that value. Microcellular elastomers intended for energy absorbing applications, e.g., as automotive bumpers, generally are made with densities of 10 to 40 pounds per cubic foot whereas microcellular elastomers intended for other applications, e.g., bumper rub strips, bumper guards, side moldings, appliques and the like where energy absorption is not the prime consideration generally are made with densities of 40 to 60 pounds per cubic foot. Solid, unfoamed polyurethanes usually have a density of about 72 pounds per cubic foot. The densities of the above-described can be increased by the addition of inert fillers such as glass fibers. Such inert fillers provide improved physical properties such as increased modulus. All of these compositions, i.e., foams, microcellular and solid, filled or unfilled, can be made by the present invention.

When the product being formed is microcellular or solid, an extender can also be added to improve the load bearing and modulus properties of the composition. Extenders are not normally used in the production of flexible foams, although they can be added, if desired. Suitable extenders include low molecular weight polyols including ethylene glycol, diethylene glycol, 1,4-butanediol and the aromatic glycols, reaction products of alkylene oxides with aromatic amines or alcohols having two active hydrogens. Suitable aromatic glycols are the reaction products of alkylene oxides with amino aryl compounds and di(hydroxyalkoxy) aryl compounds, and preferably are the reaction products of ethylene oxide and aniline. Other suitable aromatic glycols include the ethylene oxide and propylene oxide adducts of bisphenol A and the propylene oxide adducts of aniline. Additional suitable extenders are the aromatic amines such as 4,4'-methylene bis(2-chloroaniline) and phenolaromatic amine-aldehyde resins which are made by the reaction of a phenol-aromatic aminealdehyde resins which are made by the reaction of a phenol such as phenol or substituted phenols having at least one unsubstituted reactive position on the aromtic nucleus, an aldehyde such as formaldehyde or other aliphatic aldehydes and an aromatic amine such as aniline or other aromatic amines having at least one or two amino hydrogens and no or one nitrogen-bonded alkyl group and at least one unsubstituted position ortho or para to the amino group.

When the product being formed is a polyurethane microcellular or foam product, this may be accomplished by employing a small amount of a blowing agent, such as $CO_2$ produced by water included in the reaction mixture (for example, from about 0.1 to about 5 weight percent of water, based upon total weight of the total reaction mixture, i.e., polyester diol, ethylenically unsaturated monomers, polyisocyanates, catalysts and other additives), or through the use of blowing agents which are vaporized by the exotherm of the reaction, or by a combination of the two methods. Illustrative blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents include thermally unstable compounds which liberate gases upon heating, such as N,N'-dimethyl-N,N'-dinitrosoterephthalamide, and the like. The quantity of blowing agent employed will vary with factors such as the density desired in the foamed product.

It is also within the scope of the invention to employ small amounts, e.g., about 0.01 percent to 5.0 percent by weight, based on the total reaction mixture, of a foam stabilizer such as a "hydrolyzable" polysiloxane-polyoxyalkylene block copolymer such as the block copolymers described in U.S. Pat. Nos. 2,834,748 and 2,917,480. Another useful class of foam stabilizers are the "nonhydrolyzable" polysiloxane-polyoxyalkylene block copolymers such as the block copolymers described in U.S. Pat. No. 3,505,377; U.S. Patent Application Ser. No. 888,067, filed Dec. 24, 1969, and British Patent Specification No. 1,220,471. These various polysiloxane-polyoxyalkylene block copolymers preferably contain from 5 to 50 weight percent of polysiloxane polymer with the remainder being polyoxyalkylene polymer.

The following Examples are presented. Temperatures given are in °C. unless otherwise stated. The following designations used in the Examples and elsewhere herein have the following meanings:

pcf: pounds per cubic foot
psi: pounds per square inch
pli: pounds per linear inch
cps: centipoises as determined at 25° C. on a Brookfield viscosimeter
cks: centistokes viscosity
%: percent by weight unless otherwise specified
g: grams
wt: weight
parts: parts by weight unless otherwise indicated
pbw: parts by weight
ppm: parts by wt. per million parts by wt.
MA: maleic anhydride
IPA: isophthalic acid
AA: adipic acid
SA: succinic acid
DEG: diethylene glycol
PG: propylene glycol
cat: catalyst
S/U: mol ratio of saturated dicarboxylic acid or anhydride to unsaturated dicarboxylic acid or anhydride S+PG/MA+DEG: mol ratio of sum of moles of saturated dicarboxylic acid or anhydride plus moles of PG to the sum of moles MA plus moles of DEG PDO: a 50 wt.% solution of t-butyl per-2-ethylhexoate in dioctylphthalate

TBPB: PDO

PBQ: a solution of 0.7 g para-benzoquinone in 100 g styrene

BTL: dibutyltin dilaurate

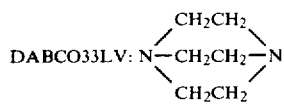

PED: accompanied by a numeral designates a polyester diol prepared according to this invention and the numeral designates the Example by which it was prepared PED: accompanied by a letter designates a polyester diol prepared not according to this invention and the letter designates the Example by which it was prepared.

GR-13017: mixture in styrene of a polyester resin of 2.5 moles maleic anhydride, 1.0 mole of phthalic acid, 2.7 moles of propylene glycol and 0.8 mole of dipropylene glycol, having a molecular weight of about 2000, an acid number of 19.9 mg KOH/g (polyester resin plus styrene) and a hydroxyl number of 29.9 mg KOH/g (polyester resin plus styrene).

PVAS: a solution of 30 to 40 wt.% of poly(vinyl acetate) in styrene

PCL: a 40% solution of crystalline thermoplastic polycaprolactone having a melting point of about 60° C. in styrene.

The polyisocyantes used in the Examples are identified as follows:

FNCO: free isocyanate content expressed in wt.% of the polyisocyanate

MDI: 4,4'-diphenylmethylene diisocyanate

Liquid MDI: modified 4,4'-diphenylmethylene diisocyanate modified with carbodiimides to liquefy same.

Polymeric MDI: polymeric diphenylmethylene diisocyanates having the formula

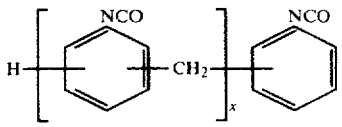

wherein x has an average value of 1 to 5.

TDI: a mixture of 80% 2,4-tolylene diisocyanate and 20% 2,6-tolylene diisocyanate.

I-129: a quasi-prepolymer polyisocyanate comprising the reaction product of polypropylene oxide triol, made from propylene oxide and glycerine and having a theoretical number average molecular weight of about 260 and a nominal hydroxyl number of about 650, and TDI. The reaction product is adjusted to an acidity of 0.007 to 0.012% HCl and has a calculated equivalent weight of 129 and an FNCO of 32.5 wt.%.

I-137: a quasi-prepolymer polyisocyanate comprising the reaction product of the polypropylene oxide triol described in respect to I-129 above and TDI. The reaction product is adjusted to an acidity of 0.007 to 0.012% HCl and has a calculated equivalent weight of 137 and an FNCO of 30.7.

I-143L: liquid MDI having a calculated equivalent weight of 144 and an FNCO of 29.2 wt.% sold by Upjohn Company as Isonate 143L.

I-901: polymeric MDI having a calculated equivalent weight of 140 and an FNCO of 30 wt.% sold by Upjohn as PAPI-901.

I-191: a mixture of I-143L and I-901 having a calculated equivalent weight of 145 and an FNCO of 29 wt.% sold by Upjohn as Isonate-191.

I-181: a quasi-prepolymer of MDI and dipropylene glycol having a calculated equivalent weight of 181 and an FNCO of 23.2 wt.% sold by Upjohn as Isonate-181.

I-222: a quasi-prepolymer of MDI and glycols having a calculated equivalent weight of 222 and an FNCO of 18.9 sold by Upjohn as Isonate 222.

I-226: a quasi-prepolymer of MDI and ethylene-butylene adipate having a calculated equivalent weight of 226 and an FNCO of 18.6 sold by Upjohn as Isonate-226.

Polyol additives used in the Examples, are identified as follows:

Polyol 1: a terpolymer polyol of caprolactone, diethylene glycol and adipic acid having a calculated molecular weight of 2915 and a hydroxyl number of 38.5.

Polyol 2: an adduct of 2.4 moles ethylene oxide per mole of aniline having a calculated molecular weight of 199 and a hydroxy number of 565.

Polyol 3: polycaprolactone having a calculated MW of 530 and a hydroxyl number of 212.

Polyol 4: polycaprolactone having a calculated MW of 2000 and a hydroxyl number of 56.1.

Polyol 5: a polypropylene glycol having a calculated MW of 2990 and a hydroxyl number of 37.5.

Polyol 6: a polypropylene glycol having a calculated MW of 425 and a hydroxyl number of 265.

Polyol 7: a phenol-formaldehyde-aniline condensate having a calculated MW of 401, a hydroxyl number of 560 and a functionality (f) of four.

Polyol 8: a mixture of 50 parts of Polyol 7 and 50 parts of propylene glycol, the mixture having a calculated MW of 128 and a hydroxyl number of 1010.

Polyol 9: a hydroxylated polybutadiene having a calculated MW of 2815 and a hydroxyl number of 39.8, sold as Poly-BD by Arco Chemical Company, Div. of Atlantic Richfield Company.

Polyol 10: a diol made by reacting 0.65 mole MA, 1.35 moles caprolactone and 1 mole DEG and having a fumarate to maleate ratio of 52/48, a hydroxyl number of 114, an acid number of 0.47, a calculated MW of 984 and a viscosity of 3910 cks at 25° C.

Polyol 11: a polycaprolactone prepared by polymerizing caprolactone using dipentaerythritol as the initiator and having a nominal number average molecular weight of 11600, a hydroxyl number of 26 and an acid number of less than 2.

Polyol 12: a polycaprolactone prepared by polymerizing caprolactone using dipentaerythritol as the initiator and having a nominal number average MW of 6000, a hydroxyl number of 48 and an acid number less than 2.

RIM: reaction injection molding machine or process.

R/A: ratio of weight of resin package to weight of activator package mixed in the RIM process.

Rheometrics,$E_{ULT}$: ultimate energy expressed in in.-lb. needed to break a 4"×4"×0.125" test sample as determined by the Rheometrics High Rate Impact test utilizing an impact tester made by Rheometrics, Incorporated, of Union, New Jersey in which a hydraulically-driven, ¼" diameter dart moving at a velocity of 5350 in./min. (5 mph) is impacted against the test sample.

| Property | ASTM Test Method |
|---|---|
| Density, pcf: | D 1564 |
| Hardness, Shore D: | D 2240 |
| Tensile strength psi: | D 412 |
| Tensile modulus, psi: | D 412 |
| Elongation, % including: | D 412 | tinued allowing the mixture to cool down to room temperature and then heating was again begun at the following day. In some instances, the heating was carried out during the period of three or more consecutive days. The products in each case were light to dark yellow liquids at ambient temperatures. These products are further characterized by hydroxyl number, acid number, the calculated molecular weight and viscosity as given in Table 1 below. The Fumarate/Maleate ratios were measured and are given in Table 1 below and indicate the extent to which the maleate moiety was isomerized to the fumarate moiety by heat during the condensation.

TABLE 1

| EX. | MA | IPA | AA | SA | S/U | DEG | PG | PG/DEG | S + PG/MA + PEG | Fumarate Maleate | OH # | Acid # | Calculated M.W. | Viscosity 25° C. |
|---|---|---|---|---|---|---|---|---|---|---|---|---|---|---|
| A | 0.8 | 0.2 | | | 0.25 | 1.5 | 0.5 | 0.33 | 0.3 | | 218 | 1.55 | 515 | 1600 cps |
| B | 0.25 | 0.75 | | | 3.00 | 1.5 | 0.5 | 0.33 | 0.71 | | 388 | 10.4 | 289 | 3130 cps |
| 1 | 0.6 | 0.4 | | | 0.66 | 1.5 | 0.5 | 0.33 | 0.43 | | 356 | 0.63 | 315 | 2450 cps |
| 2 | 0.8 | 0.2 | | | 0.25 | 0.5 | 1.5 | 3.00 | 1.3 | | 276 | 0.66 | 407 | 28,000 cps |
| 3 | 0.6 | 0.4 | | | 0.66 | 0.5 | 1.5 | 3.00 | 1.7 | | 286 | 0.36 | 392 | 26,250 cps |
| 4 | 0.4 | 0.6 | | | 1.55 | 1.5 | 0.5 | 0.33 | 0.58 | | 235 | 0.87 | 477 | 22,550 cps |
| 5 | 0.25 | 0.75 | | | 3.00 | 1.5 | 0.5 | 0.33 | 0.71 | | 355 | 0.91 | 316 | 4150 cps |
| 6 | 0.25 | 0.75 | | | 3.00 | 1.65 | 0.55 | 0.33 | 0.68 | 96/4 | 330 | 0.74 | 340 | 5600 cps |
| 7 | 0.25 | 0.75 | | | 3.00 | 1.5 | 0.5 | 0.33 | 0.71 | | 361 | 0.66 | 311 | |
| 8 | 0.25 | 0.75 | | | 3.00 | 1.5 | 0.5 | 0.33 | 0.71 | | 328 | 0.38 | 342 | |
| 9 | 0.5 | 0.5 | | | 1.0 | 1.5 | 0.5 | 0.33 | 0.5 | | 307 | 1.15 | 365 | 11,240 cps |
| 10 | 0.6 | 0.4 | | | 0.66 | 1.5 | 0.5 | 0.33 | 0.43 | | 373 | 0.65 | 301 | |
| 11 | 0.6 | 0.4 | | | 0.66 | 1.5 | 0.5 | 0.33 | 0.43 | 97/3 | 280 | 0.45 | 401 | 5640 cks |
| 12 | 0.5 | 0.25 | 0.25 | | 1.00 | 1.5 | 0.5 | 0.33 | 0.5 | 88/12 | 402 | 0.33 | 279 | 595 cks |
| 13 | 0.5 | 0.25 | | 0.25 | 1.00 | 1.5 | 0.5 | 0.33 | 0.5 | 89/11 | 381 | 0.31 | 294 | 930 cks |
| 14 | 0.75 | | 0.25 | | 0.33 | 1.5 | 0.5 | 0.33 | 0.33 | 61/39 | 338 | 0.62 | 332 | 885 cks |
| 15 | 0.6 | 0.4 | | | 0.66 | 1.5 | 0.5 | 0.33 | 0.43 | 90/10 | 362 | 0.46 | 310 | 2230 cks |
| 16 | 0.5 | 0.5 | | | 1.00 | 1.5 | 0.5 | 0.33 | 0.5 | | 367 | 0.42 | 306 | 1915 cks |
| 17 | 0.6 | 0.4 | | | 0.66 | 1.5 | 0.5 | 0.33 | 0.43 | 98/2 | 329 | 0.4 | 341 | 3100 cks |
| 18 | 0.5 | 0.25 | 0.25 | | 1.00 | 1.5 | 0.5 | 0.33 | 0.5 | 95/5 | 370 | 0.19 | 303 | 845 cks |
| 19 | 0.5 | 0.5 | | | 1.00 | 1.5 | 0.5 | 0.33 | 0.5 | | 375 | 0.37 | 300 | — |

| Property | ASTM Test Method | |
|---|---|---|
| ultimate or maximum elongation and yield elongation | | |
| Yield strength, psi: | D 412 | |
| Flexural modulus, psi: | D 790 | |
| Notched Izod Impact, ft.-lb./in.: | D 256 | (Method A) |

EXAMPLES A, B AND 1 THROUGH 19

In each of these Examples, the reactants listed in Table 1 were charged into a standard, round bottomed, one-liter four-neck flask equipped with a mechanical stirrer, thermometer, 10"×1.5" glass column packed with Raschig rings, water-cooled condenser, cold trap and receiver. This apparatus was mounted in an electric heating mantle controlled by a rheostat.

In each case the entire reaction was carried out in an inert nitrogen atmosphere in which the nitrogen was first passed through a bubbler which acted as a gas trap and a visual indicator of the rate of gas flow. In each case a 10% excess of the glycols over and above the amounts shown in Table 1 were employed to allow for glycol loss during the high temperature condensation process used to form the polyester diols of each Example. In each case, the reaction mixture was heated slowly, and stirred after melting until the initial exotherm occurred. The approximate heating times within the temperature ranges specified in Table 2 were utilized in each case. In most cases, the heating times given are aggregates of the times in the temperature ranges specified in the table on two or more consecutive days in which at the end of each day the heating was discon-

TABLE 2

APPROXIMATE HEATING TIMES WITHIN TEMPERATURE RANGES (°C.) GIVEN BELOW (hrs:mins)

| EX. | Up to 160 | 160-175 | 176-200 | 201-215 | 216-230 |
|---|---|---|---|---|---|
| A | 1:20 | — | 3:40 | 3:10 | 3:05 |
| B | 1:15 | — | 1:55 | 7:15 | — |
| 1 | 0:35 | — | 4:55 | 4:15 | 3:00 |
| 2 | 1:15 | — | 2:30 | 7:40 | 0:05 |
| 3 | 3:10 | 3:55 | 2:35 | 12:05 | — |
| 4 | 2:30 | — | 2:45 | 10:55 | 10:50 |
| 5 | 2:25 | — | 12:20 | 8:45 | 3:00 |
| 6 | 2:55 | — | 6:15 | 11:35 | 4:30 |
| 7 | 3:20 | — | 4:15 | 16:35 | — |
| 8 | 4:10 | — | 8:00 | 13:20 | — |
| 9 | 3:45 | — | 16:40 | 6:10 | — |
| 10 | 1:55 | — | 5:30 | 7:45 | — |
| 11 | 3:00 | — | 5:55 | 14:25 | 0:05 |
| 12 | 1:10 | — | 4:25 | 10:10 | — |
| 13 | 1:20 | 3:50 | 0:55 | 5:10 | 4:35 |
| 14 | 1:35 | 3:45 | 1:50 | 6:55 | — |
| 15 | 3:30 | 3:20 | 12:05 | 9:25 | — |
| 16 | 3:45 | — | 6:55 | 8:50 | 3:00 |
| 17 | 2:55 | — | 3:20 | 12:10 | 5:30 |
| 18 | 3:00 | 1:05 | 6:00 | 8:15 | 4:10 |
| 19 | 3:45 | — | 3:35 | 13:40 | 1:40 |

EXAMPLES 20–31 AND C, D, G, H and I

Compositions pursuant to the present invention and several compositions not according to the present invention were prepared from the polyester diols, polyisocyanate, styrene and other ingredients identified in Tables 3–6 below in the amounts listed in said tables. The preparation was carried out by first blending in a Hobart mixer the liquid components, namely, the polyester diol, styrene, peroxide catalyst, the inhibitor and the polyisocyanate. Thereafter, the solid materials, such as calcium carbonate, zinc stearate and glass fibers were added and mixed until a uniform mixture was obtained. A paste sample in the amounts shown in Tables 3-6 for viscosity testing purposes was withdrawn and the desired amount (400 to 500 grams) of molding charge was weighed out and encapsulated in aluminum foil which prevents the loss of styrene. The encapsulated charge is then allowed to maturate with time to reach the molding viscosity (about 100 to $10^8$ cps at 25° C. desirably $5 \times 10^6$ to $5 \times 10^7$ cps at 25° C.). The charge was then placed in a chrome-plated steel mold and compression-molded at 75 tons pressure at 270° F. for 3 minutes. The charge was then molded into a shape (12"×12"×0.125") suitable for testing. Each molded shape was then subjected to Izod impact, flexural modulus and flexural strength tests and the results thereof are given in Tables 3-6 below.

It is clearly seen in Table 3 that the polyester diol according to the present invention as illustrated in Examples 20-23 provided superior Izod impact resistance, flexural resistance and flexural strength when compared with those properties of molded specimens made from the prior art polyester styrene mixture GR-13017 as illustrated in Example C in which no further styrene was added, Examples D and G in which no polyisocyanate was used. Example 24 illustrates the greater improved properties of high rate impact resistance, flexural strength and flexural modulus as compared to the prior art compositions containing the polyester diol GR-13017 and polyvinyl acetate in styrene (PVAS) as illustrated in Example H. Examples 25 and 27, when compared with Examples 24 and 26, tend to illustrate the advantage of utilizing ⅛ inch long glass fibers in Examples 24 and 26, as compared to the use of milled glass in Examples 25 and 27.

Examples 29 and 30 illustrate the advantages in improving in physical properties when hard-sized glass fibers are used (Examples 29 and 30) when compared to soft-sized glass fibers (Examples 28 and 31). In a hard-sized glass fiber, the size on the glass does not dissolve in styrene whereas the size on a soft-sized glass fiber does.

TABLE 3

| EXAMPLE | 20 | 21 | 22 | C | D |
|---|---|---|---|---|---|
| PED-12 | 228 | 228 | 152 | — | — |
| I-181 | 292 | 292 | 195 | 36 | — |
| Styrene | 80 | 80 | 53 | — | — |
| PDO | 8 | 8 | 5.3 | 12 | 12 |
| PBQ | 0.6 | 0.3 | 0.4 | 0.6 | 0.6 |
| CaCO₃ | — | — | 200 | — | — |
| Zn Stearate | — | — | — | 18 | 18 |
| Paste Sample | −175 | −175 | −175 | −175 | −175 |
| Glass Fibers, ¼" length | 434 | 434 | 431 | 455 | 455 |
| GR-13017 | — | — | — | 375 | 360 |
| PVAS | — | — | — | 188 | 240 |
| H₂O | — | — | — | — | 0.6 |
| MgO Thickener | — | — | — | — | 30 |
| Izod Impact, ft./lbs/in. | 16 | 13 | 9 | 7 | 7 |
| Flexural Modulus, psi × $10^{-6}$ | 1.4 | 1.6 | 1.7 | 1.2 | 1.2 |
| Flexural Strength, psi × $10^{-3}$ | 26 | 33 | 24 | 22 | 25 |

TABLE 4

| EXAMPLE | 23 | 23-1 | 23-2 | G |
|---|---|---|---|---|
| PED-12 | 114 | — | — | — |
| I-181 | 146 | 124 | 116 | — |
| Styrene | 40 | 71 | 68 | — |
| PDO | 4 | 4 | 4 | 6 |
| PBQ | 0.15 | 0.15 | 0.15 | 0.3 |
| Zn Stearate | — | — | — | 9 |
| Paste Sample | −87.5 | −54 | −54 | −81 |
| Glass Fibers, ¼" length | 217 | — | — | — |
| Glass Fibers, ⅛" length | — | 250 | 250 | 250 |
| GR-13017 | — | — | — | 180 |
| PVAS | — | — | — | 120 |
| H₂O | — | — | — | 0.3 |
| MgO Thickener | — | — | — | 15 |
| PED-16 | — | 105 | 98 | — |
| Polyol 1 | — | — | 18 | — |
| Izod Impact, ft./lbs/in. | 10 | 13 | 14 | 7 |
| Flexural Modulus, psi × $10^{-6}$ | 1.5 | 1.5 | 1.3 | 1.4 |
| Flexural Strength, psi × $10^{-3}$ | 31 | 30 | 21 | 27 |

TABLE 5

| EXAMPLE | 24 | H | 25 | 26 | I | 27 |
|---|---|---|---|---|---|---|
| PED-19 | — | — | — | 132 | — | — |
| PED-1 | — | — | — | — | — | 100 |
| PED-16 | 176 | — | — | — | — | — |
| PED-10 | — | — | 100 | — | — | — |
| Polyol 2 | 34 | — | — | 25.5 | — | — |
| I-181 | 268 | — | — | 201 | — | — |
| I-191 | — | — | 102 | — | — | 98 |
| Styrene | 122 | — | 46 | 91.5 | — | 46 |
| TBPB | — | — | 1 | — | — | 1 |
| PDO | 8 | 12 | — | 6 | 12 | — |
| BTL | — | — | 0.1 | — | — | 0.1 |
| PBQ | 0.3 | 0.6 | — | 0.2 | 0.6 | — |
| PVAS | — | 240 | — | — | 240 | — |
| MgO Thickener | — | 30 | — | — | 30 | — |
| GR-13017 | — | 360 | — | — | 360 | — |
| Zinc Stearate | — | 18 | — | — | 18 | — |
| H₂O | — | 0.6 | — | — | 0.6 | — |
| Paste Sample | −158 | −211 | — | −56 | −256 | — |
| Glass Fibers, ⅛" length* | 45 | 45 | — | 80 | 80 | — |
| Milled Glass | — | — | 25 | — | — | 49 |
| Izod Impact, ft.lbs/in. | 3 | 2 | 0.6 | 4 | 3.5 | 0.6 |
| Flex Modulus, psi × $10^{-5}$ | 6 | 4 | 7 | 9 | 6 | 9 |
| Flex Strength, psi | 12,500 | 7,900 | — | 24,000 | 11,700 | — |
| Rheometrics High Rate Impact Energy to Break, in lbs. | 78 | 32 | 8 | 160 | 82 | 9 |

*hard sized

TABLE 6

| Example | 28 | 29 | 30 | 31 |
|---|---|---|---|---|
| PED-16 | 118 | 118 | 118 | 118 |
| I-901 | 102 | 102 | 102 | 102 |
| Styrene | 80 | 80 | 80 | 80 |
| PBQ | 0.15 | 0.15 | 0.15 | 0.15 |
| PDO | 4 | 4 | 4 | 4 |
| Paste Sample | −54 | −54 | −54 | −54 |
| Glass Fibers, ⅛" long, Hard sized* | — | 250 | 250 | — |
| Glass Fibers, ⅛" long, soft sized** | 250 | — | — | 250 |
| Izod Impact, ft. lbs/inch | 12 | 11 | 12 | 9 |
| Flex Modulus, pis × $10^{-5}$ | 15 | 17 | 14 | 11 |
| Flex Strength, psi × $10^{-3}$ | 22 | 34 | 24 | 21 |
| Rheometrics High Rate Impact | | | | |

TABLE 6-continued

| Example | 28 | 29 | 30 | 31 |
|---|---|---|---|---|
| Energy to break, in-lbs. | 185 | 246 | 195 | 131 |

*Hard sized, - i.e., size does not dissolve in styrene sold as PPG 450 by Pittsburgh Plate Glass Company
**Soft sized, - i.e., size does dissolve in styrene sold as PPG 3521 by Pittsburgh Plate Glass Company

EXAMPLES 32-36

In these Examples, the types and amounts of reactants, catalysts and inhibitors are listed in Table 7. In Example 32, the polyester diol, styrene, peroxide catalyst and the BTL catalyst were mixed together and degassed. Then the polyisocyanate which was degassed also, was poured with stirring into the mixture. This reaction mixture was highly catalyzed to provide 30 to 60 seconds gel time. The mixture was cast into ⅛" thick molds to form a solid test specimen which was then oven-cured at 100° C. for 16 hours. In Examples 33 through 36, resin packages and activator packages each containing the ingredients listed in Table 7 were prepared. In Example 33, the resin package and activator package were mixed by hand and hand-cast and oven-cured in the manner described above. The resin and activator package in Example 33 simulated reactant streams to be used in machine processing.

In Examples 34 through 36 the resin and activator packages were mixed and reacted in a laboratory RIM machine using the processing conditions set forth in Table 7. The machine provided the injection of the desired ratio of resin and isocyanate through a mixing head equipped with a mechanical mixer. In these Examples, the resin package contained a sufficient amount of polyurethane catalyst (BTL and DABCO) to provide a fast gel time of about 8 seconds. Test specimens of Examples 34-36 were cut from slabs molded and cured at a temperature of 100° C. and ambient pressure.

The test specimens from all of these Examples were tested for physical properties the results of which are presented in Table 7. These Examples illustrate the superior physical properties provided by the present invention and demonstrate the processability of the novel compositions of this invention in RIM machines.

TABLE 7

| EXAMPLE | 32 | 33 | 34 | 35 | 36 |
|---|---|---|---|---|---|
| Formulation, parts | | | | | |
| Resin Package: | | | | | |
| PED-7 | 100 | 100 | — | — | — |
| PED-8 | — | — | 100 | → | → |
| Styrene** | 18 | 18 | 18 | → | → |
| t-Butylperoctoate | 0.65 | — | — | — | — |
| BTL | 0.05 | 0.05 | 0.25 | → | → |
| p-Benzoquinone | — | 0.036 | 0.07 | → | → |
| DABCO 33 LV | — | — | 0.20 | → | → |
| Activator Package: | | | | | |
| I-191 (a) parts | 98 | 98 | 89 | 82 | 100 |
| (b) Index | 110 | 110 | 110 | 100 | 120 |
| t-Butylperoctoate | — | 0.65 | 0.65 | → | → |
| Processing - | Handcast | Handcast* | Lab Machine | → | → |
| Resin Temp., °F. | | | 95 | → | → |
| Activator Temp., °F. | | | 75 | | |
| R/A Ratio | | | 1.31 | 1.44 | 1.19 |
| Gel Time, sec. | | | 8 | → | → |
| Physical Properties | | | | | |
| Density, pcf | 89 | 82 | 71 | 72 | 66 |
| Hardness, Shore D | 87 | 88 | 88 | 87 | 86 |
| Yield Strength, psi | | | | | |
| Yield Elongation, % | | | | | |
| Tensile Strength, psi | 12,090 | — | 10,715 | 10,685 | 8,245 |
| Ultimate Elongation, % | 5 | 3 | 4 | 4 | |
| Flex. Modulus, psi × $10^{-3}$ | | | | | |
| −20° F. | 495 | 495 | 420 | 430 | 390 |
| 75° F. | 455 | 455 | 395 | 385 | 350 |
| 158° F. | 290 | 325 | 270 | 240 | 200 |
| Ratio, −20°/158° | 1.70 | 1.51 | 1.56 | 1.81 | 1.94 |
| Notched Izod, ft-lb/in | 0.40 | 0.65 | 0.65 | 0.85 | 0.50 |
| Rheometrics, $E_{ULT}$, in.-lb. | — | — | — | — | — |

*Handcast with t-butylperoctoate housed in the isocyanate and p-benzoquinone contained in the polyester diol portion, to simulate streams used in machine processing.
**about 2 moles styrene per mole of double bond in PED.

EXAMPLES 37-47 AND J

The compositions identified in Table 8 below were molded and cut into test specimens in the manner described hereinbefore in respect to Example 32. Test specimens produced from each of the compositions were tested for physical properties which are listed in Table 8.

The data given in Table 8 shows the unsuitability of polyester diol PED A which has a ratio of a sum of moles of IPA and PG to the sum of moles of MA and DEG of less than 0:4 in producing useful moldings because of the poor high temperature properties of molded compositions made therefrom. The data also demonstrates that optimum impact resistance and optimum insensitivity to temperature of flexural modulus of test specimens made from compositions containing saturated to unsaturated acid ratios (S/U) of 1:1 and greater. The compositions using a 1:1 mole ratio of maleic acid to IPA and AA in Examples 44 and 45 provided a Rheometrics high rate impact resistance of 95 and 86, respectively. The increase in impact resistance is believed to be due at least in part to replacement of a portion of the IPA with AA.

tested for physical properties. The results of physical properties measurements are given in Table 9. The data

TABLE 8

| EXAMPLE | J | 37 | 38 | 39 | 40 | 41 | 42 | 43 | 44 | 45 | 46 | 47 |
|---|---|---|---|---|---|---|---|---|---|---|---|---|
| PED | A | 10 | 11 | 15 | 17 | 16 | 5 | 6 | 12 | 18 | 13 | 14 |
| Moles: MA | 0.8 | 0.6 | → | → | → | 0.5 | 0.25 | → | 0.5 | → | 0.5 | 0.75 |
| IPA | 0.2 | 0.4 | | | | 0.5 | 0.75 | | 0.25 | | 0.25 | — |
| AA | — | — | — | — | — | — | — | — | 0.25 | — | — | 0.25 |
| SA | — | — | — | — | — | — | — | — | — | — | 0.25 | — |
| DEG | 1.5 | → | → | → | → | → | → | → | → | → | → | → |
| PG | 0.5 | | | | | | | | | | | |
| Fumarate/Maleate | — | — | 97/3 | 90/10 | 98/2 | — | — | 96/4 | 88/12 | 95/5 | 89/11 | 61/39 |
| Calc. M.W. of PED | 515 | 301 | 401 | 310 | 341 | 306 | 316 | 340 | 279 | 303 | 294 | 332 |
| Acid No. of PED | 1.55 | 0.65 | 0.45 | 0.46 | 0.40 | 0.42 | 0.91 | 0.74 | 0.33 | 0.19 | 0.31 | 0.62 |
| Formulation, parts | | | | | | | | | | | | |
| PED | 100 | → | → | → | → | → | → | → | → | → | → | → |
| Styrene* | 60 | 46 | → | → | → | 33 | 18 | 18 | 35 | 38 | 38 | 60 |
| t-Butylper-octoate | 1.6 | 1.0 | → | → | → | 1.0 | 0.6 | 0.7 | 1.0 | 1.0 | 1.0 | 1.0 |
| BTL | 0.4 | 0.10 | 0.10 | 0.10 | 0.05 | 0.10 | 0.18 | 0.05 | 0.10 | 0.08 | 0.10 | 0.10 |
| I-191 (110 Index) | 61 | 102 | 76 | 99 | 90 | 100 | 98 | 90 | 110 | 101 | 104 | 92 |
| Reactivity | | | | | | | | | | | | |
| Gel Time, sec. | — | 60 | 130 | 40 | 55 | 85 | — | 115 | 65 | 30 | 60 | 50 |
| Physical Properties | | | | | | | | | | | | |
| Density, pcf | | 78 | 76 | 76 | 75 | 75 | | 76 | 79 | 73 | 76 | 73 |
| Hardness, D | | 89 | 88 | 88 | 85 | 82 | | 87 | 84 | 84 | 85 | 87 |
| Yield Strength, psi | | | 13,685 | 13,310 | 13,350 | | | | | 12,270 | | 12,730 |
| Yield Elong., % | | | 5 | 4 | 5 | | | | | 5 | | 5 |
| Tensile Strength, psi | 9190 | 13,650 | 10,060 | 13,125 | 13,130 | 12,580 | 11,665 | 9780 | 9510 | 10,850 | 10,715 | 12,305 |
| Ult. Elong., % | 2.4 | 6.5 | 5 | 7.5 | 6 | 6.5 | 5 | 4 | 4 | 7 | 3 | 6 |
| Flex. Modulus, psi × 10$^{-3}$ | | | | | | | | | | | | |
| −20° F. | 540 | 475 | 480 | 500 | 490 | 465 | 450 | 410 | 420 | 475 | 765 | 480 |
| 75° F. | 460 | 450 | 425 | 450 | 440 | 410 | 435 | 405 | 395 | 400 | 670 | 420 |
| 158° F. | 20 | 370 | 320 | 355 | 370 | 335 | 220 | 200 | 285 | 285 | 495 | 320 |
| Ratio, −20°/158° | 27 | 1.28 | 1.50 | 1.41 | 1.32 | 1.39 | 2.05 | 2.05 | 1.48 | 1.66 | 1.54 | 1.50 |
| Notched, Izod, ft-lb/in | 0.30 | 1.00 | 1.05 | 1.10 | 1.30 | 0.90 | 0.60 | 0.55 | 1.25 | 1.20 | 1.20 | 1.15 |
| Rheometrics, $E_{ULT}$, in.-lb. | — | 16 | 19 | 30 | 22 | 41 | — | 16 | 95 | 86 | 35 | 40 |

*about 2 mols styrene per mol of double bond of PED.

EXAMPLES 48–57

These Examples were carried out in the same manner as described hereinbefore for Example 32 using the ingredients listed in Table 9. Test specimens were prepared in the manner described hereinabove and were tested for physical properties. The results of physical properties measurements are given in Table 9. The data given in Table 9 illustrate the usefulness of a wide variety of polyisocyanates in the compositions in the present invention. The compositions of Examples 54 and 55 provided high impact resistance moldings even though the high temperature properties were not highly impressive.

TABLE 9

| Example | 37 | 39 | 48 | 49 | 50 | 51 | 52 | 53 | 54 | 55 |
|---|---|---|---|---|---|---|---|---|---|---|
| Formulation, pbw | | | | | | | | | | |
| PED 10 | 100 | — | 100 | — | 100 | 100 | — | 100 | — | 100 |
| PED 15 | — | 100 | — | 100 | — | — | 100 | — | 100 | — |
| Styrene* | 46 | → | → | → | → | → | → | → | → | → |
| t-Butylper-octoate | 1.0 | → | → | → | → | → | → | → | → | → |
| BTL | 0.10 | → | → | → | → | → | 0.13 | 0.13 | 0.10 | |
| Isocyanate at 110 Index: | | | | | | | | | | |
| I-191 | 102 | 99 | — | — | — | — | — | — | — | — |
| I-129 | — | — | 95 | — | — | — | — | — | — | — |
| I-137 | — | — | — | 99 | — | — | — | — | — | — |
| I-143L | — | — | — | — | 107 | — | — | — | — | — |
| I-901 | — | — | — | — | — | 97 | 95 | — | — | — |
| I-181 | — | — | — | — | — | — | — | 133 | — | — |
| I-222 | — | — | — | — | — | — | — | — | 157 | — |
| I-226 | — | — | — | — | — | — | — | — | — | 163 |
| I-178 | — | — | — | — | — | — | — | — | — | — |

TABLE 9-continued

| Example | 37 | 39 | 48 | 49 | 50 | 51 | 52 | 53 | 54 | 55 |
|---|---|---|---|---|---|---|---|---|---|---|
| Reactivity | | | | | | | | | | |
| Gel Time, sec. | 60 | 40 | 240 | 230 | — | 210 | 180 | 125 | 70 | 90 |
| Physical Properties | | | | | | | | | | |
| Density, pcf | 78 | 76 | 75 | 72 | 75 | 76 | 75 | 76 | 73 | 72 |
| Hardness, D | 89 | 88 | 90 | 89 | 89 | 89 | 80 | 88 | 71 | 81 |
| Yield Strength, psi | | 13,685 | | | | | 13,305 | 13,435 | | 7050 |
| Yield Elongation, % | | 5 | | | | | 5 | 5 | | 5 |
| Tensile strength, psi | 13,650 | 13,125 | 9285 | 12,770 | 11,010 | 10,380 | 11,790 | 12,555 | 1985 | 5015 |
| Ult. Elong., % | 6.5 | 7.5 | 3 | 2 | 5 | 6 | 8 | 7 | 29 | 12 |
| Flex. Modulus, psi × $10^{-3}$ | | | | | | | | | | |
| at −20° F. | 475 | 500 | 460 | 570 | 460 | 475 | 500 | 440 | 310 | 410 |
| 75° F. | 450 | 450 | 460 | 520 | 435 | 415 | 460 | 405 | 155 | 280 |
| 158° F. | 370 | 355 | 340 | 390 | 350 | 335 | 360 | 295 | 45 | 15 |
| Ratio, −20°/158° F. | 1.28 | 1.41 | 1.35 | 1.46 | 1.32 | 1.42 | 1.39 | 1.49 | 6.9 | 27 |
| Notched, Izod, ft-lb/in | 1.00 | 1.10 | 0.40 | 0.57 | 0.65 | 1.30 | 1.25 | 1.05 | 2.05 | 1.40 |
| Rheometrics, $E_{ULT}$, in.-lb. | 16 | 30 | 10 | 19 | — | 50 | 47 | 20 | 50 | 170 |

*about two moles styrene per mole of double bond.

EXAMPLES 58–80

The compositions described in Tables 10 and 11 were molded and cut into test specimens utilizing the procedures hereinbefore described in Example 32. Various polyol additives as identified in Tables 10 and 11 were mixed with the styrene, polyester diol, catalyst mixture and degassed prior to the introduction of the polyisocyanate. The amounts of tin catalyst provided the gel times correspondingly listed in Tables 10 and 11 below. Test specimens produced from each composition were tested and were found to have the physical properties listed in Tables 10 and 11. These tables show the effects of various types of polyols on the physical properties of molded articles made from the compositions of this invention.

TABLE 10

| EXAMPLE | 37 | 39 | 58 | 59 | 60 | 61 | 62 | 63 | 64 | 65 | 66 |
|---|---|---|---|---|---|---|---|---|---|---|---|
| Formulation, parts | | | | | | | | | | | |
| PED 10 | 100 | — | 92 | 92 | — | — | — | — | — | — | — |
| PED 15 | — | 100 | — | — | 92 | 84 | 66 | 92 | 84 | 66 | 92 |
| Styrene* | 46 | 43 | 43 | 43 | 39 | 31 | 43 | 39 | 31 | 43 | |
| t-Butylperoctoate | 1.0 | 1.0 | 0.92 | 0.92 | 0.92 | 0.84 | 0.66 | 0.92 | 0.84 | 0.66 | 0.92 |
| BTL | 0.10 | 0.10 | 0.10 | 0.15 | 0.07 | 0.08 | 0.10 | 0.10 | 0.10 | 0.13 | 0.10 |
| Polyol Additive: | | | | | | | | | | | |
| Polyol 3 | — | — | 8 | — | — | — | — | — | — | — | — |
| Polyol 4 | — | — | — | 8 | 8 | 16 | 34 | — | — | — | — |
| Polyol 1 | — | — | — | — | — | — | — | 8 | 16 | 34 | — |
| Polyol 5 | — | — | — | — | — | — | — | — | — | — | 8 |
| Polyol 6 | — | — | — | — | — | — | — | — | — | — | — |
| I-191 at 110 Index | 102 | 99 | 98 | 95 | 92 | 85 | 70 | 91 | 84 | 68 | 92 |
| Reactivity | | | | | | | | | | | |
| Gel Time, sec. | 60 | 40 | 85 | 50 | 60 | 50 | 25 | 60 | 140 | 35 | 60 |
| Physical Properties | | | | | | | | | | | |
| Density, pcf | 78 | 76 | 75 | 79 | 74 | 74 | 71 | 72 | 74 | 75 | 68 |
| Hardness, D | 89 | 88 | 89 | 88 | 86 | 82 | 80 | 87 | 86 | 85 | 86 |
| Yield Strength, psi | | 13,685 | | | 13,040 | | | | | 8900 | |
| Yield Elongation, % | | 5 | | | 5 | | | | | 1 | |
| Tensile Strength, psi | 13,650 | 13,125 | 14,360 | 13,565 | 12,500 | 13,675 | 9755 | 12,975 | 12,245 | 7195 | 9930 |
| Ult. Elong., % | 6.5 | 7.5 | 5 | 5 | 6 | 5 | 4 | 9 | 10 | 14 | 13 |
| Flex. Modulus, psi × $10^{-3}$ | | | | | | | | | | | |
| −20° F. | 475 | 500 | 490 | 590 | 500 | 495 | 450 | 470 | 475 | 465 | 435 |
| 75° F. | 450 | 450 | 450 | 510 | 460 | 440 | 350 | 415 | 410 | 345 | 390 |
| 158° F. | 370 | 355 | 335 | 315 | 290 | 180 | 35 | 255 | 190 | 29 | 280 |
| Ratio, −20°/158° | 1.28 | 1.41 | 1.46 | 1.87 | 1.72 | 2.75 | 13 | 1.84 | 2.50 | 16 | 1.55 |
| Notched Izod, ft-lb/in | 1.00 | 1.10 | 0.85 | 0.80 | 0.90 | 0.95 | 1.20 | 1.10 | 0.80 | 1.05 | 0.95 |
| Rheometrics, $E_{ULT}$, in.-lb. | 16 | 30 | 50 | 95 | 34 | 33 | 42 | 31 | 29 | 39 | — |

TABLE 10-continued

| EXAMPLE | 67 | 68 | 69 | 70 | 71 |
|---|---|---|---|---|---|
| Formulation, parts | | | | | |
| PED 10 | — | — | — | — | — |
| PED 15 | 84 | 66 | 92 | 84 | 66 |
| Styrene* | 39 | 31 | 43 | 39 | 31 |
| t-Butylperoctoate | 0.84 | 0.66 | 0.92 | 0.84 | 0.66 |
| BTL | 0.10 | 0.10 | 0.10 | 0.10 | 0.07 |
| Polyol Additive: | | | | | |
| Polyol 3 | — | — | — | — | — |
| Polyol 4 | — | — | — | — | — |
| Polyol 1 | — | — | — | — | — |
| Polyol 5 | 16 | 34 | — | — | — |
| Polyol 6 | — | — | 8 | 16 | 34 |
| I-191 at 110 Index | 85 | 69 | 96 | 94 | 89 |
| Reactivity | | | | | |
| Gel Time, sec. | 120 | 120 | 55 | 30 | 35 |
| Physical Properties | | | | | |
| Density pcf | 69** | 73** | 74 | 74 | 73 |
| Hardness, D | 85 | 74 | 81 | 78 | 88 |
| Yield Strength, psi | | | 14,065 | | |
| Yield Elongation, % | | | 5 | | |
| Tensile Strength, psi | 5940 | 1385 | 13,735 | 13,910 | 11,140 |
| Ult. Elong., % | 12 | 21 | 6 | 5 | 5 |
| Flex. Modulus, psi × 10$^{-3}$ | | | | | |
| −20° F. | 305 | 215 | 485 | 500 | 460 |
| 75° F. | 250 | 42 | 455 | 450 | 410 |
| 158° F. | 190 | 16 | 365 | 335 | 145 |
| Ratio, −20°/158° | 1.61 | 13 | 1.33 | 1.49 | 3.17 |
| Notched Izod, ft-lb/in | 0.70 | 2.10 | 0.95 | 0.90 | 0.85 |
| Rheometrics, $E_{ULT}$, in.-lb. | — | — | 20 | 15 | 182 |

*about two moles styrene per mole of double bond.
**Phase separation occurred in plaques due to presence of excessive amounts of Polyol 4 additive.

TABLE 11

| EXAMPLE | 37 | 39 | 72 | 73 | 74 | 75 | 76 | 77 | 78 | 79 | 80 |
|---|---|---|---|---|---|---|---|---|---|---|---|
| Formulation, parts | | | | | | | | | | | |
| PED-10 | 100 | — | 90 | 80 | 70 | 80 | 80 | 83 | 66 | — | — |
| PED-15 | — | 100 | — | — | — | — | — | — | — | 92 | 84 |
| Styrene* | 46 | 46 | 42 | 37 | 32 | 37 | 37 | 38 | 31 | 43 | 39 |
| t-Butylperoctoate | 1.0 | 1.0 | 0.9 | 0.8 | 0.7 | 0.8 | 0.8 | 0.83 | 0.66 | 0.92 | 0.84 |
| BTL | 0.10 | 0.10 | 0.10 | 0.10 | 0.15 | 0.10 | 0.10 | 0.10 | 0.08 | 0.10 | 0.10 |
| Polyol Additive: | | | | | | | | | | | |
| Polyol 8 | — | — | 10 | 20 | 30 | — | — | — | — | — | — |
| Polyol 7 | — | — | — | — | — | 20 | 20 | — | — | — | — |
| Polyol 2 | — | — | — | — | — | — | — | 17 | 34 | — | — |
| Polyol 9 | — | — | — | — | — | — | — | — | — | 8 | 16 |
| I-191 at 110 Index | 102 | 99 | 118 | 134 | 150 | 111 | 111 | 111 | 119 | 92 | 85 |
| Reactivity | | | | | | | | | | | |
| Gel Time, sec. | 60 | 40 | 85 | 150 | 35 | 45 | 45 | 70 | 55 | 45 | 55 |
| Physical Properties | | | | | | | | | | | |
| Density, pcf | 78 | 76 | 80 | 79 | 80 | 74 | 74 | 80 | 79 | 74 | 69 |
| Hardness, D | 89 | 88 | 89 | 89 | 88 | 88 | 89 | 89 | 86 | 85 | |
| Yield Strength, psi | | 13,685 | | 15,745 | | | | 15,005 | | 9790 | 9045 |
| Yield Elongation, % | | 5 | | 6 | | | | 5 | | 5 | 4 |
| Tensile Strength, psi | 13,650 | 13,125 | 14,380 | 14,695 | 14,385 | 12,150 | 13,205 | 14,560 | 13,725 | 8690 | 8680 |
| Ult. Elongation, % | 6.5 | 7.5 | 6 | 7 | 4 | 4 | 11 | 6 | 4 | 8.5 | 8.0 |
| Flex. Modulus, psi × 10$^{-3}$ | | | | | | | | | | | |
| −20° F. | 475 | 500 | 505 | 505 | 505 | 465 | 485 | 500 | 470 | 440 | 395 |
| 75° F. | 450 | 450 | 455 | 465 | 440 | 420 | 440 | 465 | 450 | 425 | 345 |
| 158° F. | 370 | 355 | 390 | 410 | 390 | 355 | 390 | 390 | 360 | 335 | 270 |
| Ratio, −20/158 F. | 1.28 | 1.41 | 1.29 | 1.23 | 1.29 | 1.32 | 1.24 | 1.28 | 1.31 | 1.31 | 1.46 |
| Notched Izod, ft-lb/in. | 1.00 | 1.10 | 1.00 | 1.00 | 0.75 | 0.90 | 0.60 | 0.85 | 0.60 | 0.90 | 0.95 |
| Rheometrics, $E_{UTL}$, | | | | | | | | | | | |

TABLE 11-continued

| EXAMPLE | 37 | 39 | 72 | 73 | 74 | 75 | 76 | 77 | 78 | 79 | 80 |
|---|---|---|---|---|---|---|---|---|---|---|---|
| in-lb. | 16 | 30 | — | — | 30 | — | 7 | 65 | 50 | 14 | 50 |

*about two moles styrene per mole of double bond

EXAMPLES 81–84

Compositions as described in Table 12 were molded and cut into test specimens in the manner described hereinabove in regard to Example 32. In Examples 81, 83 and 84, a polyol as indicated in Table 12 was added to the mixture of styrene, polyester diol and catalysts before the polyisocyanate was introduced. The physical properties of the test specimens were measured and are given in Table 12. Certain physical properties of commercially available "tough" polyesters were measured and are also given in Table 12 for comparison. Comparison of the physical properties shows that the impact resistance of articles made according to the present invention is far superior to the two commercial "tough" polyesters tested. The Derakane polyester is a bisphenol A vinyl polyester composition made by Dow Chemical Company. The Rockwell NR polyester is made from 2 mols maleic anhydride, 1 mol isophthalic acid or anhydride, and a mixture of glycols containing 87 mol % diethylene glycol and 13 mol % ethylene glycol.

TABLE 12

| | | | | | Commercial "Tough" Polyesters | |
|---|---|---|---|---|---|---|
| Example | 81 | 82 | 83 | 84 | Derakane 411-C-50* | Rockwell NR2036 |
| Formulation, parts | | | | | | |
| PED 12 | 92 | — | — | — | | |
| PED 18 | — | 100 | 90 | — | | |
| PED 16 | — | — | — | 50 | | |
| Polyol 10 | — | — | — | 50 | | |
| Styrene | 36 | 39 | 35 | 42 | | |
| t-Butylperoctoate | 0.92 | 1.0 | 0.9 | 1.0 | | |
| BTL | 0.08 | 0.08 | 0.09 | 0.08 | | |
| Polyol 4 | 8 | — | — | — | | |
| Polyol 1 | — | — | 10 | — | | |
| 1,4-Butanediol | — | — | — | — | | |
| I-901 at 110 Index | 96 | 97 | 80 | — | | |
| T-191 at 110 Index | — | — | — | 65 | | |
| Reactivity | | | | | | |
| Gel Time, sec. | 120 | 15 min. | 40 | 45 | | |
| Physical Properties | | | | | | |
| Density, pcf | 75 | — | — | 72 | | |
| Hardness, D | 86 | 86 | 86 | 84 | | |
| Yield Strength, psi | 12,410 | — | 12,385 | 10,660 | | |
| Yield Elong., % | 5 | — | 5 | 5 | | |
| Tensile Strength, psi | 10,065 | 12,100 | 11,265 | 8830 | 11,500 | 10,400 |
| Ult. Elong., % | 10 | 7 | 8 | 8 | 5 | 3.5 |
| Flex. Modulus, psi × 10$^{-3}$ | | | | | | |
| −20° F. | 475 | 495 | 505 | 450 | 500 | 500 |
| 75° F. | 425 | 430 | 440 | 380 | | |
| 158° F. | 250 | 290 | 210 | 155 | | |
| Ratio, −20°/158 | 1.90 | 1.70 | 2.40 | 2.87 | | |
| Notched Izod, ft-lb/in | 1.65 | 1.85 | 1.60 | 1.40 | 0.1 | 0.1 |
| Rheometrics, E$_{ULT}$, in.-lb. | 214 | 59 | 43 | 62 | 7 | 6 |

*Dow Chemical Company

EXAMPLES 85 and 86

The compositions as described in Table 13 for these Examples were prepared. Each include a polyol additive based on polycaprolactone materials. The compositions were molded and cut into test specimens as previously described in Example 32. The test specimens were tested for physical properties which are listed in Table 13. The polycaprolactone material additives appear to provide some additional improvement in Rheometrics high rate impact resistance.

TABLE 13

| EXAMPLE | 39 | 85 | 86 |
|---|---|---|---|
| Formulation, pbw | | | |
| PED 15 | 100 | 92 | 92 |
| Styrene | 46 | 43 | 43 |
| t-Butyl Peroctoate | 1.0 | 0.92 | 0.92 |
| BTL | 0.10 | 0.13 | 0.13 |
| Polyol 11 | — | 8 | — |
| Polyol 12 | — | — | 8 |
| I-191 at 110 Index | 99 | 92 | 92 |
| Gel Time, sec. | 40 | 55 | 80 |
| Physical Properties | | | |
| Density, pcf | 76 | 74 | 74 |
| Hardness, D | 88 | 80 | 78 |
| Yield Strength, psi | 13,685 | — | 9215 |
| Yield Elong., % | 5 | — | 5 |
| Tensile Strength, psi | 13,125 | 12,185 | 8460 |
| Ult. Elong., % | 7.5 | 5 | 8 |
| Flex. Modulus, psi × 10$^{-3}$, | | | |
| at −20° F. | 500 | 480 | 480 |
| 75° F. | 450 | 435 | 445 |
| 158° F. | 355 | 295 | 300 |
| Modulus Ratio −20/158° | 1.41 | 1.63 | 1.60 |
| Notched Izod, Ft.-lb/in. | 1.10 | 0.80 | 1.05 |
| Rheometrics, E$_{ULT}$,in.-lb. | 30 | 58 | 42 |

EXAMPLES 87–93

Several compositions were prepared from the ingredients listed in Table 14 in order to demonstrate the effects of various glass fillers. Glass fillers as identified in Table 14 were added to the degassed polyester diol, styrene and catalysts mixture in the amounts given in Table 14. Test specimens were molded from the compositions in the manner described hereinbefore in regard to Example 32 and said specimens were tested for physical properties which are listed in Table 14. In the compositions shown the addition of milled glass improved the flexural modulus but reduced somewhat the impact resistance. The addition of the tiny glass bubbles does not provide any advantage and lowers the Rheometrics high rate impact resistance. The results also indicate the advantages of utilizing hard-sized glass fibers ¼" long to greatly enhance the Rheometrics high rate impact resistance.

above-mentioned conditions. Then the polyisocyanate was added and the resulting mixture was stirred. The resulting mixture was rapidly cast between glass plates coated with a mold release into a plaque measuring 11"×6"×0.125". The plaques were cured for 16 hours at 100° C. and were cut into test specimens which were tested for physical properties. The test results are given correspondingly in Tables 16 and 18. Examples 94 through 112 illustrate the advantages of the present invention as compared to compositions, namely, Examples K-R outside the scope of the present invention. It is important to note the desirably low levels of thermal coefficients of linear expansion of the polyurathane/vinyl polymer copolymers of this invention compared to urethane polymers and polyester resins which have thermal coefficients of linear expansion in the 50 to $75 \times 10^{-6}$ inches/°F. range. The thermal coefficients of linear expansion of the polyurethane/vinyl polymer copolymers of this invention are much closer to the coefficients of commonly used metals than the coefficients of polyurethanes and polyester resins.

TABLE 14

| EXAMPLE | 87 | 37 | 52 | 88 | 89 | 90 | 91 | 92 | 93 |
|---|---|---|---|---|---|---|---|---|---|
| Formulation, parts | | | | | | | | | |
| PED 1 | 100 | — | — | — | 100 | — | — | — | — |
| PED 10 | — | 100 | — | 100 | — | — | — | — | — |
| PED 17 | — | — | 100 | — | — | 100 | → | → | → |
| Styrene | 48 | 46 | 46 | 46 | → | → | → | → | → |
| t-Butyl Peroctoate | 2.6 | 1.0 | 1.0 | 1.0 | | | | | |
| BTL | 0.19 | 0.10 | 0.13 | 0.10 | 0.10 | 0.08 | 0.08 | 0.03 | 0.02 |
| Glass Filler: | | | | | | | | | |
| Milled Glass | — | — | — | 25 | 50 | — | — | — | — |
| Glass Fibers, ¼" long, soft-sized* | — | — | — | — | — | 6 | — | — | — |
| Glass Fibers, ¼" long, hard-sized** | — | — | — | — | — | — | 6 | — | — |
| Tiny Glass Bubbles (Treated - 3M) | — | — | — | — | — | — | — | 36 | — |
| Tiny Glass Bubbles (Untreaded - 3M) | — | — | — | — | — | — | — | — | 36 |
| I-191 at 110 Index | 99 | 102 | — | 102 | 98 | — | — | — | — |
| I-901 at 110 Index | — | — | 95 | — | — | 95 | 95 | 95 | 95 |
| Reactivity | | | | | | | | | |
| Gel Time, sec. | — | 60 | 180 | 50 | 40 | 100 | 170 | 70 | — |
| Physical Properties | | | | | | | | | |
| Density, pcf | | 78 | 75 | 80 | 82 | 76 | 77 | 56 | 55 |
| Hardness D | | 89 | 80 | 88 | 89 | 88 | 87 | 83 | 83 |
| Yield Strength, psi | | | 13,305 | | | | | | |
| Yield Elong., % | | | 5 | | | | | | |
| Tensile Strength, psi | 12,680 | 13,650 | 11,790 | 14,245 | 14,460 | 13,595 | 10,120 | 8530 | 7030 |
| Ult. Elong., % | 5 | 6.5 | 8 | 5 | 3 | 4 | 2 | 2 | 2 |
| Flex Modulus, psi × 10⁻³ | | | | | | | | | |
| −20° F. | 510 | 475 | 500 | 885 | 1085 | 525 | 530 | 450 | 425 |
| 75° F. | 485 | 450 | 460 | 770 | 970 | 490 | 500 | 420 | 395 |
| 158° F. | 365 | 370 | 360 | 635 | 835 | 400 | 400 | 360 | 340 |
| Ratio −20° F./158° F. | 1.48 | 1.28 | 1.39 | 1.39 | 1.30 | 1.31 | 1.33 | 1.24 | 1.26 |
| Notched Izod, ft-lb/in. | 0.50 | 1.00 | 1.25 | 0.60 | 0.55 | 1.00 | 1.00 | 0.45 | 0.45 |
| Rheometrics, Ult., ft-lb/in. | 29 | 16 | 47 | 8 | 9 | 12 | 144 | 30 | 20 |
| % Glass in Polymer | 0 | 0 | 0 | 10 | 20 | 2.5 | 2.5 | 15 | 15 |

*PPG 3531
**PPG 450

EXAMPLES 94–112 AND K-R

The compositions described in Tables 15 and 17 were prepared by degassing the polyester diol for 20 minutes at about 1 millimeter mercury pressure and 40° C. to remove dissolved gases. The styrene TBPO and BTL were added to the degassed polyester diol and the resulting mixture was degassed for 2 minutes under the

TABLE 15

| EXAMPLE | PED# | PED (pbw) | TBPO(%)(pbw) | Styrene (pbw) | I-191 (pbw) | BTL (pbw) |
|---|---|---|---|---|---|---|
| 94 | 4 | 120.5 | 0.6 | 38 | 70 | 0.2 |
| 95 | ↓ | 120.5 | 0.8 | 67.5* | 77 | 0.2 |
| 96 | ↓ | 120.5 | 1.4 | 38* | 77 | 0.2 |
| 97 | ↓ | 120.5 | 1.5 | 67.5** | 70 | 0.2 |
| 98 | 5 | 109.9 | 0.7 | 19.6* | 107.8 | 0.2 |
| 99 | ↓ | 109.9 | 0.7 | 32.9** | 98 | 0.2 |

TABLE 15-continued

| EXAMPLE | PED# | PED (pbw) | TBPO(%)(pbw) | Styrene (pbw) | I-191 (pbw) | BTL (pbw) |
|---|---|---|---|---|---|---|
| 100 | ↓ | 109.9 | 1.4 | 19.6* | 98 | 0.2 |
| 101 | ↓ | 109.9 | 1.5 | 32.9** | 107.8 | 0.2 |

*two moles styrene per double bond of PED
**three moles styrene per double bond of PED

TABLE 16

| EX. | Isocyanate Index | Peroxide % | Flexural Modulus, psi × 10⁻⁶ a | | | | −20° F. 158° F. | Tensile Mod., psi | Tensile Strength psi | Elongation at yield, | Elongation % Max. % | Izod Impact Inch Lbs. |
|---|---|---|---|---|---|---|---|---|---|---|---|---|
| | | | −20° F. | 75° F. | 158° F. | 250° F. | | | | | | |
| 94 | 100 | 0.3 | 0.524 | 0.194 | 0.00077 | 0.00098 | 680 | 0.11 | 2770 | 25.6 | 25.6 | 0.54 |
| 95 | 110 | 0.3 | 0.480 | 0.427 | 0.205 | 0.00185 | 2.34 | 0.49 | 8773 | 4.80 | 5.8 | 0.77 |
| 96 | 110 | 0.6 | 0.454 | 0.428 | 0.157 | 0.00206 | 2.89 | 0.51 | 8666 | 4.80 | 6.25 | 1.07 |
| 97 | 100 | 0.6 | 0.454 | 0.424 | 0.134 | 0.00161 | 3.16 | 0.50 | 7716 | 5.10 | 7.05 | 0.76 |
| 98 | 110 | 0.3 | 0.452 | 0.435 | 0.221 | 0.00122 | 2.04 | 0.56 | 11666 | 4.90 | 5.05 | 0.62 |
| 99 | 100 | 0.3 | 0.445 | 0.428 | 0.269 | 0.00143 | 1.65 | 0.55 | 9426 | 5.90 | 11.45 | 0.97 |
| 100 | 100 | 0.6 | 0.436 | 0.417 | 0.253 | 0.00131 | 1.72 | 0.54 | 9516 | 5.85 | 10.00 | 0.95 |
| 101 | 110 | 0.6 | 0.444 | 0.407 | 0.257 | 0.00130 | 1.73 | 0.55 | 8200 | 5.60 | 11.25 | 0.72 |

TABLE 17

| Ex. | PED | PED AMOUNT | TBPO | Styrene | I-191 | BTL |
|---|---|---|---|---|---|---|
| K | A | 125.5 | 1.0 | 75.0 | 70.0 | 0.40 |
| L | ↓ | ↓ | 1.0 | 37.5 | 77.0 | 0.20 |
| M | ↓ | ↓ | 2.0 | 37.5 | 70.0 | 0.20 |
| N | ↓ | ↓ | 2.0 | 75.0 | 77.0 | 0.50 |
| O* | ↓ | ↓ | 0.0 | 75.0 | 70.0 | 0.20 |
| 102 | 1 | 78.0 | 1.0 | 37.5 | 70.0 | 0.15 |
| 103 | ↓ | ↓ | 1.0 | 75.0 | 77.0 | 0.25 |
| 104 | ↓ | ↓ | 2.0 | 75.0 | 70.0 | 0.25 |
| 87 | ↓ | ↓ | 2.0 | 37.5 | 77.0 | 0.15 |
| P | ↓ | ↓ | 0.0 | 0.0 | 70.0 | 0.15 |
| 105 | 2 | 100.0 | 1.0 | 37. | 70.0 | 0.20 |
| 106 | ↓ | ↓ | 1.0 | 75.0 | 77.0 | 0.35 |
| 107 | ↓ | ↓ | 2.0 | 75.0 | 70.0 | 0.35 |
| 108 | ↓ | ↓ | 2.0 | 37.5 | 77.0 | 0.20 |
| Q | ↓ | ↓ | 0.0 | 0.0 | 70.0 | 0.20 |
| 109 | 3 | 96.5 | 1.0 | 75.0 | 70.0 | 0.20 |
| 110 | ↓ | ↓ | 1.0 | 37.5 | 77.0 | 0.20 |
| 111 | ↓ | ↓ | 2.0 | 37.5 | 70.0 | 0.20 |
| 112 | ↓ | ↓ | 2.0 | 75.0 | 77.0 | 0.20 |
| R | ↓ | ↓ | 0.0 | 0.0 | 70.0 | 0.05 |

*Did not cure (taffylike)

TABLE 18

| EXAMPLE | Moles Styrene Of Double Bond of PED | Thermal Coefficient of Linear Expansion Inches °F. (× 10⁻⁶) | | Isocyanate Index | Peroxide % | Flexural Modulus, psi × 10⁻⁶ | | | | −20° F./158° F. |
|---|---|---|---|---|---|---|---|---|---|---|
| | | −20–0° F. | 20–40° F. | | | −20° F. | 75° F. | 158° F. | 250° F. | |
| K | 2.1 | 23.8 | 32.0 | 100 | 0.46 | 0.567 | 0.430 | 0.0043 | 0.0015 | 132 |
| L | 1.3 | 24.7 | 32.1 | 110 | 0.41 | 0.567 | 0.451 | 0.0022 | 0.0014 | 258 |
| M | 1.3 | 19.6 | 37.4 | 100 | 0.85 | 0.571 | 0.390 | 0.0022 | 0.0015 | 259 |
| N | 2.1 | 23.4 | 30.7 | 110 | 0.71 | 0.540 | 0.458 | 0.0201 | 0.0013 | 29.6 |
| 102 | 2.2 | 24.8 | 26.0 | 100 | 0.54 | 1.420 | 0.422 | 0.270 | 0.0018 | 5.26 |
| 103 | 3.3 | 25.1 | 22.8 | 110 | 0.43 | 0.754 | 0.435 | 0.285 | 0.0018 | 2.64 |
| 104 | 3.3 | 26.6 | 28.7 | 100 | 0.89 | 0.467 | 0.397 | 0.285 | 0.0015 | 1.64 |
| 87 | 2.2 | 25.0 | 23.8 | 110 | 1.02 | 0.512 | 0.484 | 0.363 | 0.027 | 1.41 |
| 105 | 1.4 | 22.6 | 22.8 | 100 | 0.48 | 0.530 | 0.479 | 0.345 | 0.0059 | 1.54 |
| 106 | 2.3 | 22.9 | 23.8 | 110 | 0.40 | 0.526 | 0.475 | 0.378 | 0.0628 | 1.39 |
| 107 | 2.3 | 24.9 | 24.1 | 100 | 0.81 | 0.539 | 0.427 | 0.320 | 0.0539 | 1.68 |
| 108 | 1.4 | 24.3 | 19.9 | 110 | 0.92 | 0.496 | 0.446 | 0.252 | 0.0019 | 1.97 |
| 109 | 2.8 | 25.3 | 25.0 | 100 | 0.41 | 0.598 | 0.477 | 0.371 | 0.0058 | 1.61 |
| 110 | 1.8 | 22.6 | 22.5 | 110 | 0.47 | 0.508 | 0.488 | 0.364 | 0.0048 | 1.39 |
| 111 | 1.8 | 20.4 | 20.3 | 100 | 0.97 | 0.519 | 0.497 | 0.395 | 0.0292 | 1.31 |
| 112 | 2.8 | 25.8 | 19.4 | 110 | 0.80 | 0.501 | 0.485 | 0.384 | 0.0352 | 1.30 |
| P | 0.0 | 27.5 | 20.3 | 100 | 0.0 | 0.475 | 0.418 | 0.0393 | 0.0008 | 12.1 |
| Q | 0.0 | 26.6 | 29.3 | 100 | 0.0 | 0.484 | 0.454 | 0.116 | 0.0008 | 4.17 |
| R | 0.0 | 25.0 | 21.7 | 100 | 0.0 | 0.442 | 0.442 | 0.255 | 0.0008 | 1.73 |

| EXAMPLE | Tensile Mod. psi | Tensile Strength, psi | Elongation a Yield, % | Elongation Max. % | Izod Impact Inch Lbs. |
|---|---|---|---|---|---|
| K | 0.51 | 9973 | 3.6 | 5.3 | 0.3 |
| L | 0.51 | 10520 | 3.8 | 5.0 | 1.3 |
| M | 0.44 | 8950 | 3.5 | 3.5 | 0.4 |
| N | 0.54 | 9190 | 2.4 | 2.4 | 0.3 |
| 102 | 0.48 | 11710 | 4.5 | 8.0 | 1.0 |
| 103 | 0.46 | 11200 | 4.5 | 6.8 | 0.7 |
| 104 | 0.50 | 9673 | 4.3 | 6.6 | 0.6 |
| 87 | 0.56 | 12680 | 4.5 | 4.5 | 0.5 |
| 105 | 0.54 | 12290 | 3.3 | 3.3 | 0.3 |
| 106 | 0.57 | 11140 | 3.3 | 3.3 | 0.3 |
| 107 | 0.55 | 8570 | 2.0 | 2.0 | 0.3 |
| 108 | 0.47 | 11493 | 4.3 | 6.4 | 0.7 |
| 109 | 0.51 | 12400 | 4.3 | 4.3 | 0.4 |

TABLE 18-continued

|   |   |   |   |   |   |
|---|---|---|---|---|---|
| 110 | 0.50 | 11920 | 3.5 | 3.5 | 0.5 |
| 111 | 0.52 | 12790 | 3.7 | 3.7 | 0.4 |
| 112 | 0.48 | 12580 | 4.7 | 1.7 | 0.5 |
| P | 0.47 | 9745 | 3.4 | 12 | 0.7 |
| Q | 0.54 | 10670 | 3.2 | 3.2 | 0.6 |
| R | 0.48 | 11280 | 4.3 | 4.3 | — |

EXAMPLES 113–122 AND S

Compositions were prepared from the types and amounts of ingredients listed in Tables 19 and 20 below and molded into plaques at 300° F. in a 75 ton hydraulic press for 3 minutes and test specimens were cut from the plaque. In each of Examples 113, 114 and S the press was operated with stops. In the remaining Examples, the press was operated with no stops. The test specimens were then tested for physical properties which are correspondingly listed in Tables 19 and 20 below.

TABLE 19

|  | 113 | 114 | S |
|---|---|---|---|
| PED-9 | 144 | 144 | — |
| I-181 | 144 | 144 | — |
| Styrene | 158.5 | 72 | — |
| Zn Stearate | 10.8 | 10.8 | 20 |
| TBPB | 3.6 | 3.6 | 5 |
| PBQ | 0.29 | 0.29 | — |
| BTL* | 1 | — | — |
| PCL | — | 144** | — |
| PVAS | — | — | 100 |
| GR-13017 | — | — | 400 |
| Tensile psi | 7535 | 2755 | 1987 |
| Elong. % | 2.56 | 1.57 | 0.61 |
| Flex. Mod. × 10⁻⁶ | 0.44 | 0.202 | — |
| Flex. Strength × 10⁻³ | 14.7 | 6.5 | — |

*Drops
**contains 86.4 parts of styrene

TABLE 20

|  | 115 | 116 | 117 | 118 | 119 | 120 | 121 | 122 |
|---|---|---|---|---|---|---|---|---|
| PED-9 | 64 | 70 | 76 | 64 | 64 | 64 | 64 | 64 |
| I-181 | 64 | 52 | 40 | 64 | 64 | 67 | 67 | 64 |
| Styrene | 72 | 78 | 84 | 72 | 72 | 72 | 72 | 72 |
| Zn Stearate | 6 | → | → | → | → | → | → | → |
| BPB | 2 | → | → | → | → | → | → | → |
| PBQ | 0.12 | → | → | → | → | → | → | → |
| CaCO₃ | 50 | → | → | → | → | → | → | → |
| BTL* | 2 | 2 | 4 | 2 | 4 | 4 | 4 | 3 |
| Glass fibers ¼" | 258 | → | → | → | → | → | → | — |
| Glass continuous strand |  |  |  |  |  |  |  | 225 |
| Tensile, psi | 8260 | 8613 | 4040 | 8513 | 10,285 | 9828 | 11,273 | 16,933 |
| Elong. % | 0.59 | 0.43 | 0.47 | 0.58 | 0.67 | 0.71 | 0.9 | 1.64 |
| Flex. Mod. × 10⁻⁶ | 1.67 | 1.32 | 1.04 | 1.55 | 2.05 | 1.70 | 1.47 | 1.33 |
| Flex. Strength × 10⁻³ | 28 | 11.7 | 14.3 | 19.9 | 31.6 | 27.8 | 27.5 | 28.7 |

Drops

EXAMPLE T

A composition was prepared from 78.6 g of PED-B, 81.8 g I-191, 5.2 g styrene, 8.8 g of PBQ, 1 g of TBPO and 24.6 g of a thermoplastic polyurethane powder 150 g of the composition were poured into a mold and cured for 5 minutes at 3000 psi and 150° C. The resulting plaque was glassy with bumps and air bubbles or blisters throughout. The bubbles indicated that carbon dioxide was given off during curing because of the high acid number of PED-B. The bubbles in the molded article rendered the article unsuitable for use as a structural material.

The molded article was tested and found to have a tensile modulus of $0.23 \times 10^6$ psi, a tensile strength of 3240 psi and a percent elongation of 2.71.

EXAMPLES 123–126

In each of Examples 123 and 125 a composition was prepared from 77.9 g PED 4, 20.9 g styrene, 3.7 g PBQ (250 ppm parabenzoquinone based on the weight of the composition), 45 g of I-191 and one drop of stannous octoate. In Example 123, the resulting composition after mixing was molded into a plaque at 150° C. and 3000 psi for 2 mins. In Example 125, the composition was molded at 125° C. and 3000 psi for 2 mins. Test specimens were cut from the plaques.

In each of Examples 124 and 126 the same compositions as used in Examples 123 and 125 were prepared and used except that the amount of PBQ was doubled, i.e., to 7.4 g (500 ppm parabenzoquinone based on the total composition). In Example 124 a plaque was molded at 150° C. and 3000 psi for 2 mins. and in Example 126 the plaque was molded at 125° C. and 3000 psi for 2 mins. Test specimens were cut from the plaques.

All of the above-identified test specimens were tested for physical properties which are given in Table 21 below. These results illustrate that those compositions made through the use of 500 ppm of the inhibitor were characterized by a much higher ultimate elongation at comparable tensile strength which indicates a much improved ability to absorb energy such as would be imparted during impact.

| Example | Inhibitor, ppm.* | Temp.°C. | Flex.Mod. psi | Tensile Strength max. psi | Tensile psi | Elong. Yield % | Ultimate Elong. % |
|---|---|---|---|---|---|---|---|
| 123 | 250 | 150 | 0.48 | 9550 | 7870 | 3.38 | 3.54 |
| 124 | 500 | 150 | 0.45 | 8350 | 4795 | 3.25 | 5.72 |
| 125 | 250 | 125 | 0.50 | 8600 | 6000 | 2.87 | 3.75 |

| Example | Inhibitor, ppm.* | Temp. °C. | Flex.Mod. psi | Tensile Strength max. psi | Tensile psi | Elong. Yield % | Ultimate Elong. % |
|---|---|---|---|---|---|---|---|
| 126 | 500 | 125 | 0.45 | 8200 | 5700 | 3.02 | 4.49 |

*based on weight of styrene and polyester diol

What is claimed is:

1. A polyester diol/monomer composition which is convertible by reaction with a polyisocyanate to a polyurethane and which is polymerizable in the presence of a vinyl polymerization catalyst comprising
    (A) a polyester diol comprising:
        (a) aliphatically saturated divalent diacyl moieties of the formula

wherein R is a single bond connecting the two carbonyl groups or a divalent organic group free of aliphatic unsaturation, and olefinically unsaturated divalent diacyl moieties of the formula

wherein R' is a divalent olefinically unsaturated organic group, said diacyl moieties being present in a mole ratio of 0.25 to 3 moles of said diacyl moieties essentially free of aliphatic unsaturation per mole of said olefinically unsaturated diacyl moieties; and
        (b) divalent dioxy moieties having the formula: —OR"O— wherein R" is a divalent organic group interconnecting the oxy groups shown in said formula and each oxy group shown by said formula is bonded to a non-carboxyl atom of said R" group;
        said diacyl moieties being bonded through ester linkages to said dioxy moieties in a mole ratio of at least 1.75 moles of all said dioxy moieties per mole of all said diacyl moieties; and said polyester diol
        (i) being end-blocked essentially only by non-carboxylic hydroxyl groups bonded to dioxy moieties as defined in (b) hereinabove; and
        (ii) having an acid number of less than 3,
    (B) a polymerizable ethylenically unsaturated monomer present in an amount providing about 1 to about 6 ethylenically unsaturated groups of said monomer per olefinically unsaturated group of said polyester diol,
    (C) a catalyst capable of catalyzing polyurethaneforming reactions of polyisocyanates and polyhydroxy compounds, and
    (D) a vinyl polymerization inhibitor.

2. Composition as claimed in claim 1 wherein said vinyl polymerization inhibitor is present in amounts of at least 250 parts per million parts of said composition.

3. Composition as claimed in claim 1 wherein said polymerizable ethylenically unsaturated monomer contains one ethylenic group per molecule.

4. Composition as claimed in claim 3 wherein said monomer is present in an amount providing about 2 moles of monomer per olefinically unsaturated group of said polyester diol.

5. Composition as claimed in claim 4 wherein the amount of vinyl polymerization inhibitor ranges from about 500 to about 1000 parts per million parts of said composition.

6. Composition as claimed in claim 1 wherein said polymerizable ethylenically unsaturated monomer is styrene and said polyester diol is claimed in claim 6.

7. Tough polyurethane/vinyl polymer copolymer of
    (I) a polyester diol comprising:
        (a) aliphatically saturated divalent diacyl moieties of the formula

wherein R is a single bond connecting the two carbonyl groups or a divalent organic group free of aliphatic unsaturation, and olefinically unsaturated divalent diacyl moieties of the formula

wherein R' is a divalent olefinically unsaturated organic group, said diacyl moieties being present in a mole ratio of 0.25 to 3 moles of said diacyl moieties essentially free of aliphatic unsaturation per mole of said olefinically unsaturated diacyl moieties; and
        (b) divalent branched dioxy moieties having the formula: —OR'''O— wherein R''' is a divalent branched chain composed of carbon and hydrogen or carbon, hydrogen and oxygen and containing 2 to 8 consecutive atoms of carbon and oxygen interconnecting the oxy groups shown in said formula and having alkyl groups of one to eight carbon atoms bonded to one or more carbon atoms of said consecutive atoms, and divalent linear dioxy moieties having the formula: —OR''''O— wherein R'''' is a linear chain composed of carbon and hydrogen or carbon, hydrogen and oxygen and containing 2 to 8 consecutive atoms of carbon or carbon and oxygen interconnecting the oxy groups shown in said formula, said dioxy moieties being present in a mole ratio of 0.3 to 3 moles of said branched dioxy moieties per mole of said linear dioxy moieties;
        said diacyl moieties being bonded through ester linkages to said dioxy moieties in a mole ratio of at least 1.75 moles of all said dioxy moieties per mole of all said diacyl moieties; and said polyester diol
        (i) being end-blocked essentially only by alcoholic hydroxyl groups formed from oxy atoms of dioxy moieties as defined in (b) hereinabove; and
        (ii) having an acid number of less than 3, (II) a polymerizable ethylenically unsaturated monomer present in an amount providing about 1 to about 6 ethylenically unsaturated groups of said monomer per olefinically unsaturated group of said polyester diol, and (III) a polyisocyanate present in an amount providing about 0.9 to about 1.2 isocyanate groups per hydroxyl group of said polyester diol.

8. Tough polyurethane/vinyl polymer copolymer as claimed in claim 7 wherein said polyisocyanate is an aromatic polyisocyanate.

9. Tough polyurethane/vinyl polymer copolymer as claimed in claim 8 wherein said polymerizable ethylenically unsaturated monomer is present in an amount providing 1 to 3 ethylenically unsaturated groups per olefinically unsaturated group of said polyester diol.

10. Tough polyurethane/vinyl polymer copolymer as claimed in claim 9 wherein said polyester diol has an acid number of less than one, said polymerizable ethylenically unsaturated polymer is styrene and said aromatic polyisocyanate is a diphenyl methylene diisocyanate or polyisocyanate derivative thereof.

11. Tough polyurethane/vinyl polymer copolymer as claimed in claim 10 wherein said aromatic polyisocyanate is tolylene diisocyanate or polyisocyanate derivative thereof.

12. Tough polyurethane/vinyl polymer copolymer as claimed in claim 7 wherein a reinforcing agent is dispersed throughout said copolymer.

13. Tough polyurethane/vinyl polymer copolymer as claimed in claim 12 wherein said reinforcing agent comprises glass fibers.

14. Method of producing a tough polyurethane/vinyl polymer copolymer by reacting a mixture comprising
(a) a polyester diol as defined in claim 1;
(b) an organic polyisocyanate; and
(c) a polymerizable ethylenically unsaturated monomer in the presence of
(d) a catalyst for the reaction of (a) and (b);
(e) a catalyst for the reaction of (a) and (c).

15. Method as claimed in claim 14 wherein said reaction is conducted in the presence of a vinyl polymerization inhibitor in an amount sufficient to inhibit substantial vinyl polymerization until the reaction of (a) and (b) is at least 50% complete.

16. Method as claimed in claim 15 wherein said inhibitor is present in an amount of about 500 to about 1000 ppm of the composition of (a), (b), (c), (d) and (e).

17. Method as claimed in claim 14 wherein said reaction is conducted in the presence of a reinforcing agent dispersed throughout said mixture.

18. Method as claimed in claim 17 wherein said reinforcing agent is glass fibers present in said mixture in an amount of about 5 to about 70 wt. % of the weight of said mixture.

19. Method as claimed in claim 14 wherein said polyester diol, said polymerizable ethylenically unsaturated monomer is styrene, said catalyst for (a) and (b) is a tin catalyst and said catalyst for (a) and (c) is a peroxide catalyst.

20. Method as claimed in claim 19 wherein the mixture of (a), (c) and (d) is continuously mixed and reacted with the mixture of (b) and (e) in a machine and continuously molded into shaped articles.

21. Method of producing shaped, tough plastic articles comprising the steps of mixing a polyester diol as claimed in claim 7, a polyisocyanate and a polymerizable ethylenically unsaturated monomer to form a polymerizable composition, shaping said composition by molding to form said article and subjecting said composition to polyurethane polymerization conditions.

22. Method as claimed in claim 21 wherein said composition is maturated prior to molding to reach a suitable molding viscosity.

23. Method as claimed in claim 22 wherein evaporation of volatiles from the composition during maturation is prevented.

24. Method as claimed in claim 21 wherein said composition is shaped by injection molding.

25. Method as claimed in claim 21 wherein said composition is shaped by transfer molding.

26. Method as claimed in claim 24 wherein said composition is shaped by compression molding.

27. Method as claimed in claim 22 wherein said maturated composition is formed into a sheet and said sheet is cut and formed into the desired size and shape prior to subjecting it to polyurethane forming conditions and vinyl polymerization conditions.

28. Method as claimed in claim 27 wherein reinforcing fibers are distributed on the upper surface of said sheet, a second sheet of said maturated composition is laid over said reinforcing fibers to form a sandwich and said sandwich is compressed to merge said sheets and reinforcing fibers together, and cutting and forming said merged sheets into the desired shape and size.

29. Method as claimed in claim 21 the polyester diol/monomer composition claimed in claim 1 is rapidly mixed with a mixture of a polyisocyanate and vinyl polymerization catalyst and quickly molded in the shape of the desired article.

30. Method as claimed in claim 29 wherein said molding is conducted in a reaction injection molding machine.

* * * * *